June 1, 1954

E. G. ANDREWS 2,679,977

CALCULATOR SIGN CONTROL CIRCUIT

Filed Dec. 17, 1946

INVENTOR
E. G. ANDREWS
BY
ATTORNEY

June 1, 1954

E. G. ANDREWS 2,679,977

CALCULATOR SIGN CONTROL CIRCUIT

Filed Dec. 17, 1946

INVENTOR
E. G. ANDREWS
BY
ATTORNEY

June 1, 1954

E. G. ANDREWS 2,679,977

CALCULATOR SIGN CONTROL CIRCUIT

Filed Dec. 17, 1946

INVENTOR
E. G. ANDREWS
BY
ATTORNEY

June 1, 1954
E. G. ANDREWS
2,679,977
CALCULATOR SIGN CONTROL CIRCUIT
Filed Dec. 17, 1946
15 Sheets-Sheet 9

INVENTOR
E. G. ANDREWS
BY
ATTORNEY

INVENTOR
E. G. ANDREWS
BY
ATTORNEY

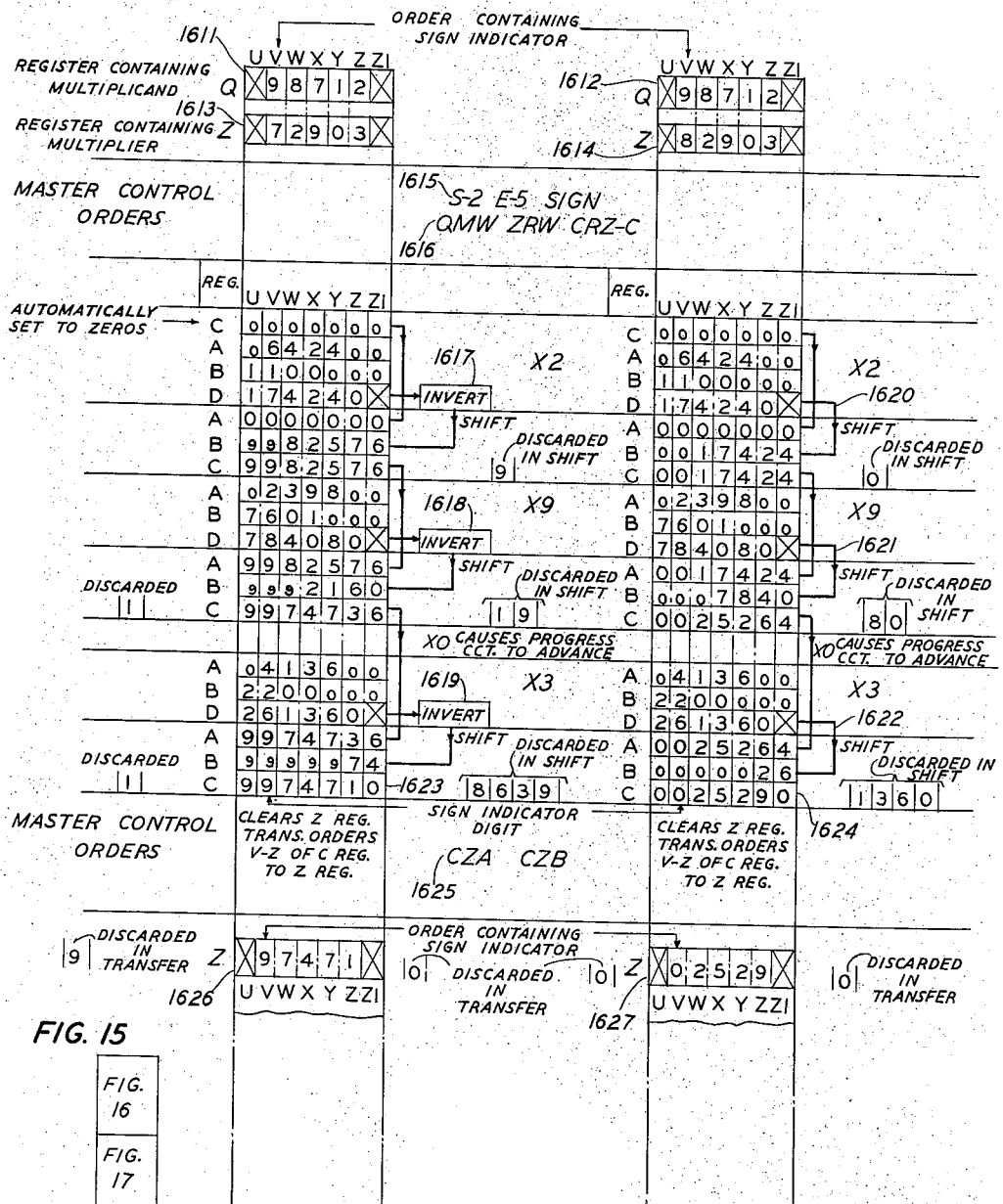
FIG. 16 — Multiplication of two numbers the signs of which are not known Patented June 1, 1954

2,679,977

UNITED STATES PATENT OFFICE 2,679,977

CALCULATOR SIGN CONTROL CIRCUIT

Ernest G. Andrews, Baldwin, N. Y., assignor to Bell Telephone Laboratories, Incorporated, New York, N. Y., a corporation of New York Application December 17, 1946, Serial No. 716,762

12 Claims. (Cl. 235—61)

This invention relates to calculators and particularly to electrical circuit network devices for carrying out mathematical operations by the movement of simple electromagnetic means without the use of gear trains, number wheels, cams or other mechanical elements.

An object of the invention is to provide calculating means which will perform long and complicated operations in a minimum of time and with a minimum of apparatus.

Another object is to promote economy by adapting, as far as possible, known and reliable communication apparatus. In accordance with this object standard relays and other apparatus whose performance and characteristics have been thoroughly tested and proved in the telephone and telegraph fields have been assembled in circuit networks of a type whose operating characteristics have been tested by hard service.

A principal object of the invention is to simplify the sign control in a calculator. Where complicated mathematical operations employing both positive and negative numbers are performed it has become of prime importance to pursue the character of the sign of a calculated factor accurately. It being axiomatic that simplicity leads to accuracy, it is an object of the present invention to replace labyrinthine sign circuits by very simple networks and to pursue the changing sign by methods which have grown out of experience with automatic calculators. It has been found for instance, that with rapidly operating electrical circuit network calculators it is expedient to break a calculation down into a series of simple steps sequentially performed rather than to try to simultaneously perform a number of such operations. While this step-by-step operation apparently entails more time, the actual operations are so rapid that time becomes of little consequence and so economy in apparatus and simplicity in operation are gained in return for this less valuable commodity.

In accordance with the present invention where a plurality of factors are involved in multiplication or division or a combination of the two, the ordinary mathematical operations are carried out in a normal and conventional manner as though all were positive quantities. When the final quotient or product is determined or at any other convenient time the sign thereof is determined. This is done by calculation rather than by the more convenientional circuit change.

In most calculators it is expedient to deal with the nine's complement so that subtraction is performed by the addition of the complement. The number 98765 is the complement of the number 01234. If the number 01234 is used to express the quantity +1234 then the number 98765 will express the quantity —1234. Hence numbers are used to express not only the values but the character of factors, so that numbers whose first digit is 0 are positive and whose first digit is 9 are negative.

This convention is carried further, herein, so that even numbers in the first denominational order are considered as positive sign indicators and odd numbers therein are considered as negative sign indicators. It is understandable that if two negative numbers are multiplied together or if one is divided by the other the product or the quotient will be positive. Hence if their sign indicators are added together an even number will be produced. Means are therefore provided for summing the sign indicators to calculate the character of the final product or quotient. Hence the numerical value of such final product or quotient is calculated in the conventional manner and the sign thereof is calculated independently by the simple addition of the sign indicators.

A feature of the invention is a means for determining by calculation both the character and the value of a factor produced by the multiplication and division of a plurality of factors.

Another feature of the invention is the complete flexibility of the device whereby the sign may be determined at any time which is convenient either before or after the determination of the product or the quotient and either in conjunction with such determination or entirely independently thereof.

Another feature of the invention is a method of calculating the character and the value of a factor which consists of first multiplying or dividing a plurality of factors into one another and then summing and adding to the said factor the sum of the sign indicators of the said factors.

Another feature of the invention is a circuit network responsive to a digit used as a sign indicator, which said network will display the character of the sign indicated thereby. In accordance with the present invention calculation is performed by multiplication, there being provided a plurality of multiplying relays for expressing a multiplicand and a plurality of cooperatively associated multiplier relays for expressing one digit at a time of a multiplier. These multiplier relays beside their cooperation with the multiplying relays also control a pair of sign conductors and are arranged so that odd numbers will characterize the negative conductor and even numbers will characterize the positive conductor. Hence the character of a derived factor will be automatically signaled when such derived factor is used in further calculation.

Another feature of the invention is the use which may be made of such a signaling circuit. In certain types of calculation the use of signs may be employed to produce an act of discrimination. Where, by way of example, it is necessary to obtain bearing values for a gun, expressed as an angle from 0 degrees to 360 degrees, the sine and/or cosine functions and their signs may be used for determining the correct quadrant of the gun bearing. Furthermore, this same sign information may be used to determine whether it is necessary to take the complements of the corresponding first quadrant angle in order to obtain the correct value for other quadrants. This same principle may also be used to advantage in interpolating in the inverse sine table. It is recognized that the accuracy of interpolation falls off rapidly when the value of the inverse function approaches the value of 1. In order to obtain better accuracy, therefore the discrimination action described below provides for (1) using the inverse sine or inverse cosine depending upon which of the two functions is the smaller and (2) adjusts the formula depending upon which of the two actions in (1) is taken, (3) determines need of taking complement or not and (4) adding in multiples of 90 degrees as required from the quadrant determination information.

These operations are accomplished by building up a block number having elements of signs of sine and cosine and sign indicators representing arc sine or arc cosine. One pattern for doing this could be

| Signs of Variables | | | Resulting Block Number |
|---|---|---|---|
| Sine | Consine | Arc Sine or Cosine | |
| + | + | Arc sine | 000 |
| + | + | Arc cosine | 009 |
| + | − | Arc cosine | 099 |
| − | + | Arc sine | 900 |
| | | and so forth | |

The net result of this is that the first two digits represent a quadrant and the third the arc sine or cosine.

With a three-digit block number each place of which is filled with a plus indicator 0 or a minus indicator 9 there will be eight possible combinations holding information for obtaining the bearing angle from $\theta$ which may be either the true or the $(90°-\theta)$ value.

| Block No. | Complement Indicator | Basic Quadrant Value, degrees |
|---|---|---|
| 000 | +1 | 0 |
| 009 | −1 | 90 |
| 099 | +1 | 90 |
| 090 | −1 | 180 |
| 900 | +1 | 180 |
| 909 | −1 | 270 |
| 999 | +1 | 270 |
| 990 | −1 | 360 |

Further, a discriminating action may be obtained by subtracting out 360 degrees when a ship's heading is added to the gun bearing to obtain a true north and south bearing and a result of more than 360 degrees is obtained. By thus building block numbers of sign indicators such block numbers subjected to the circuit which translates such a number to a sign indication may be used to properly control a sign circuit.

Other features will appear hereinafter.

The drawings consist of fifteen sheets having seventeen figures, as follows:

Fig. 1 and Fig. 2 taken together, with Fig. 1 placed above Fig. 2 is a flow chart showing the various components of the calculating device and indicating the cooperative relationship thereof;

Fig. 6 is a block diagram showing how Figs. 7 to 14 inclusive may be placed to form a complete circuit diagram of the arrangement explained by the aid of Fig. 5;

Figure 7:
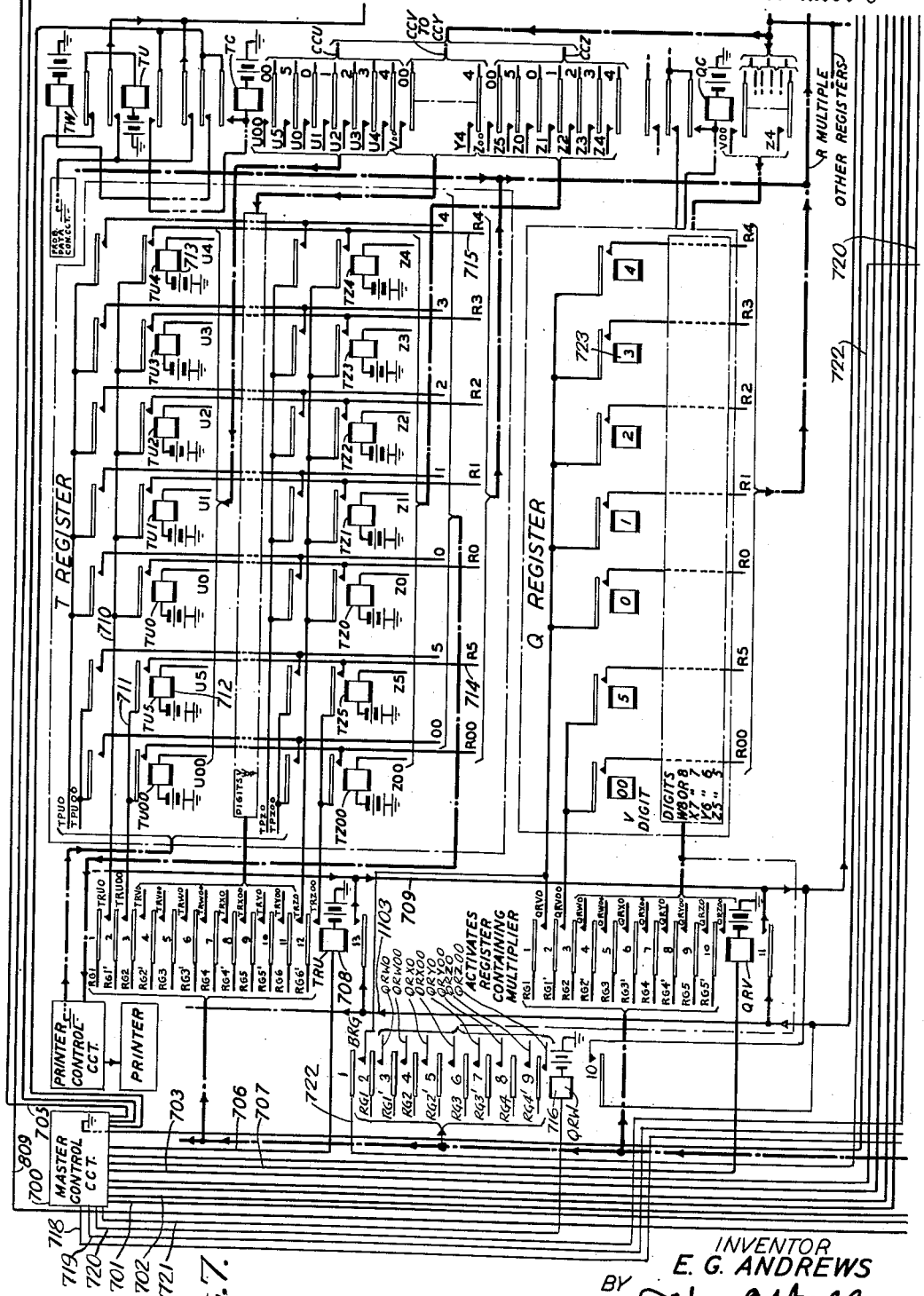
Figure 8:
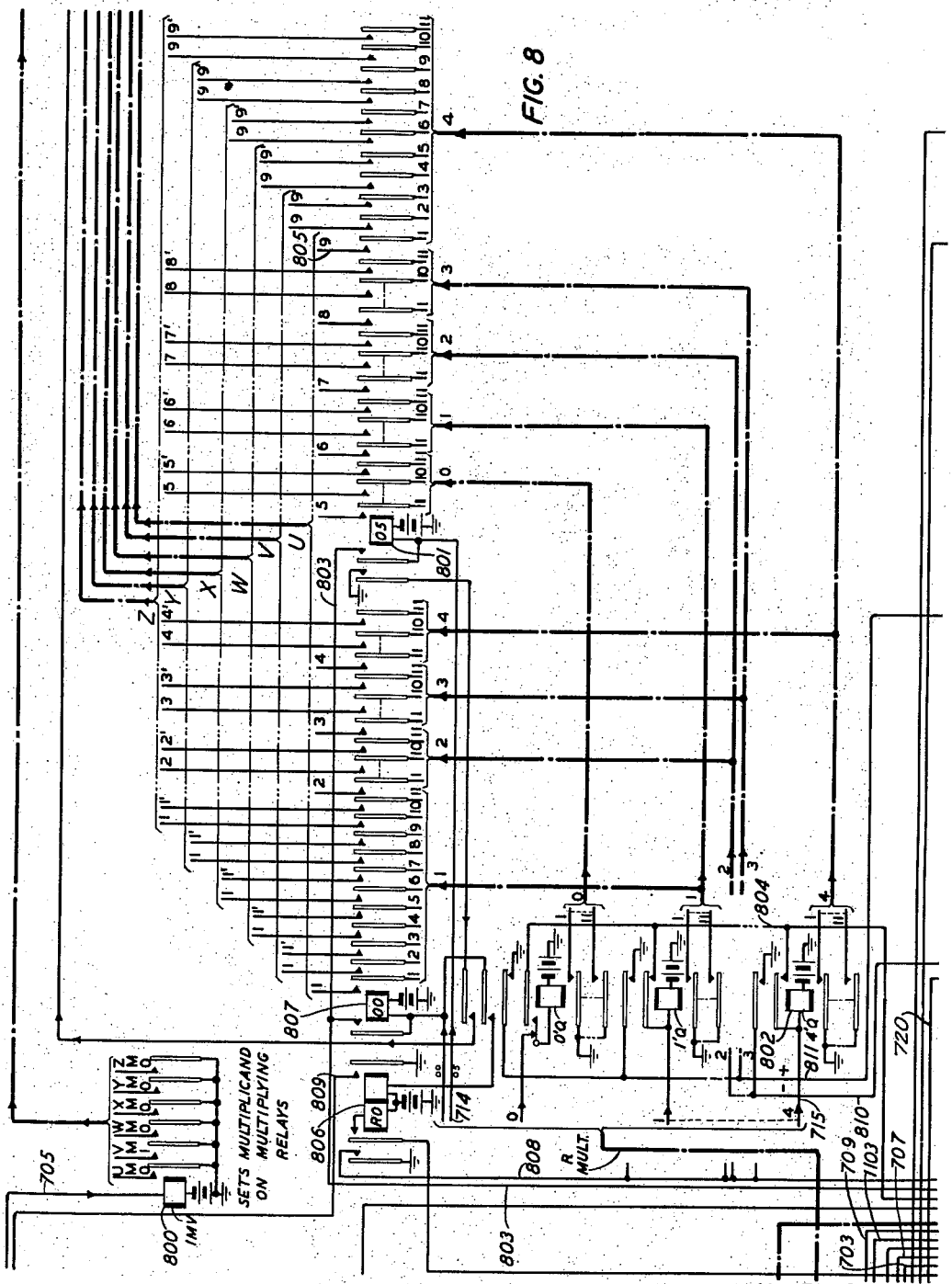
Figure 9:
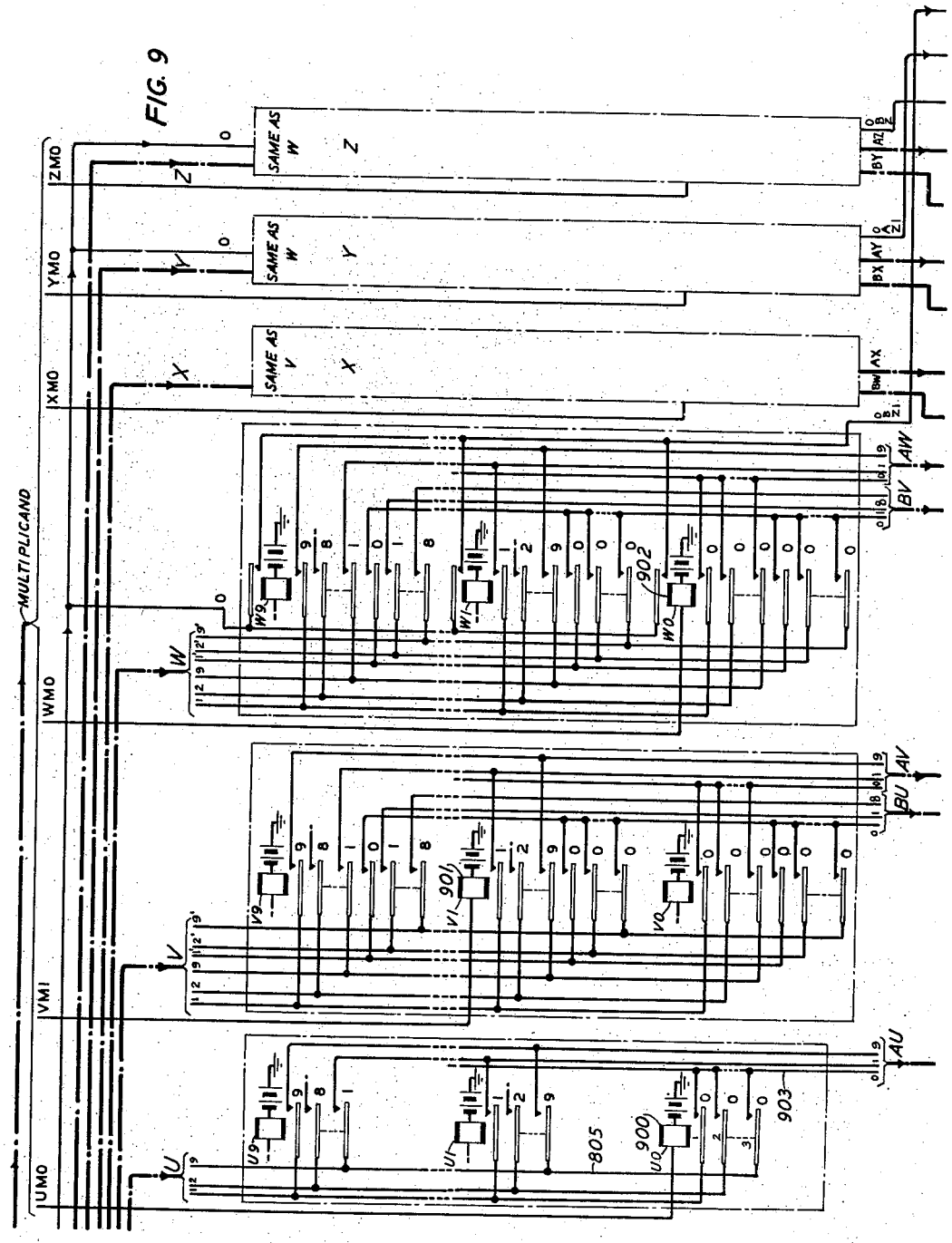
Figure 10:
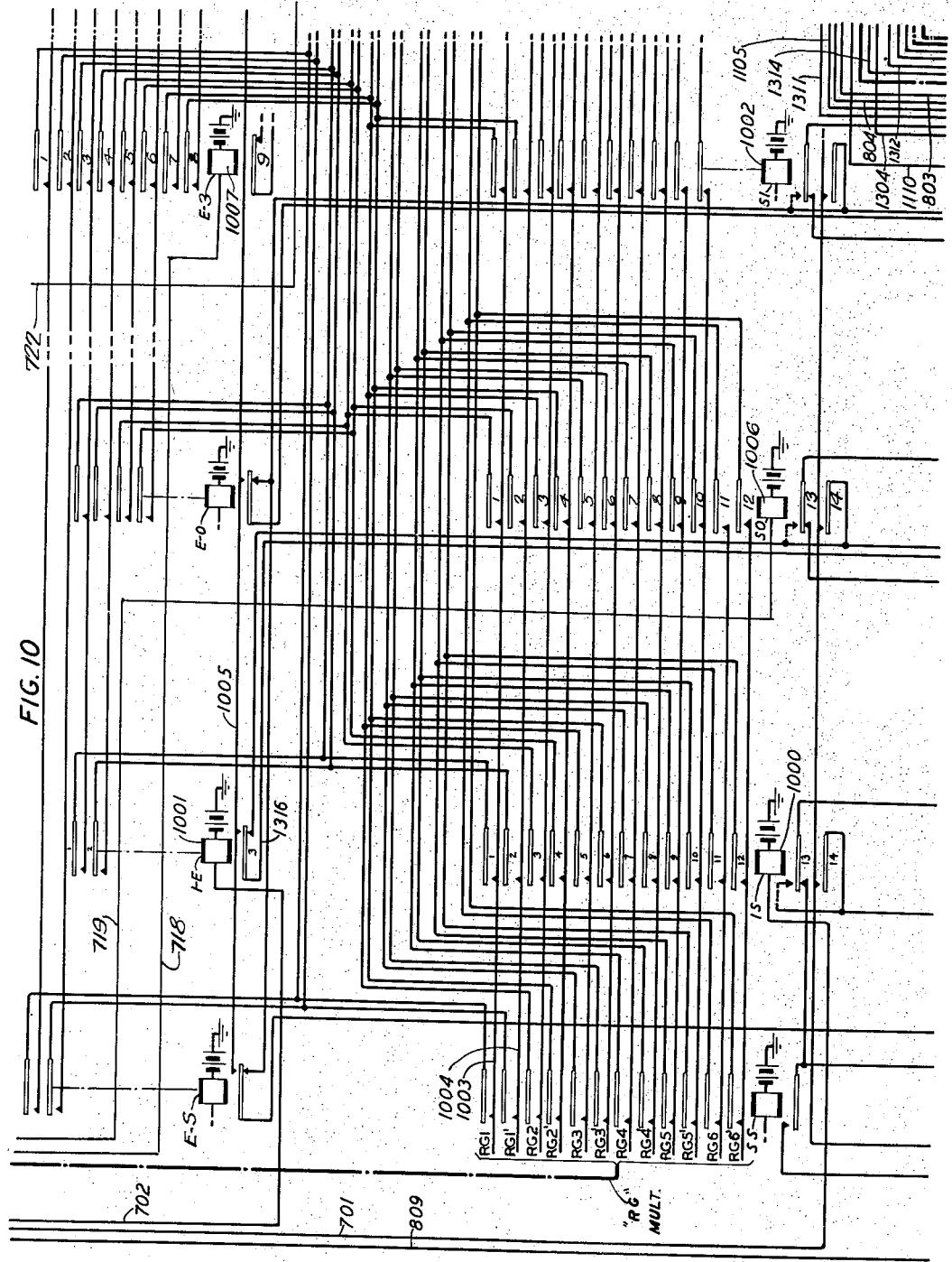
Figure 11:
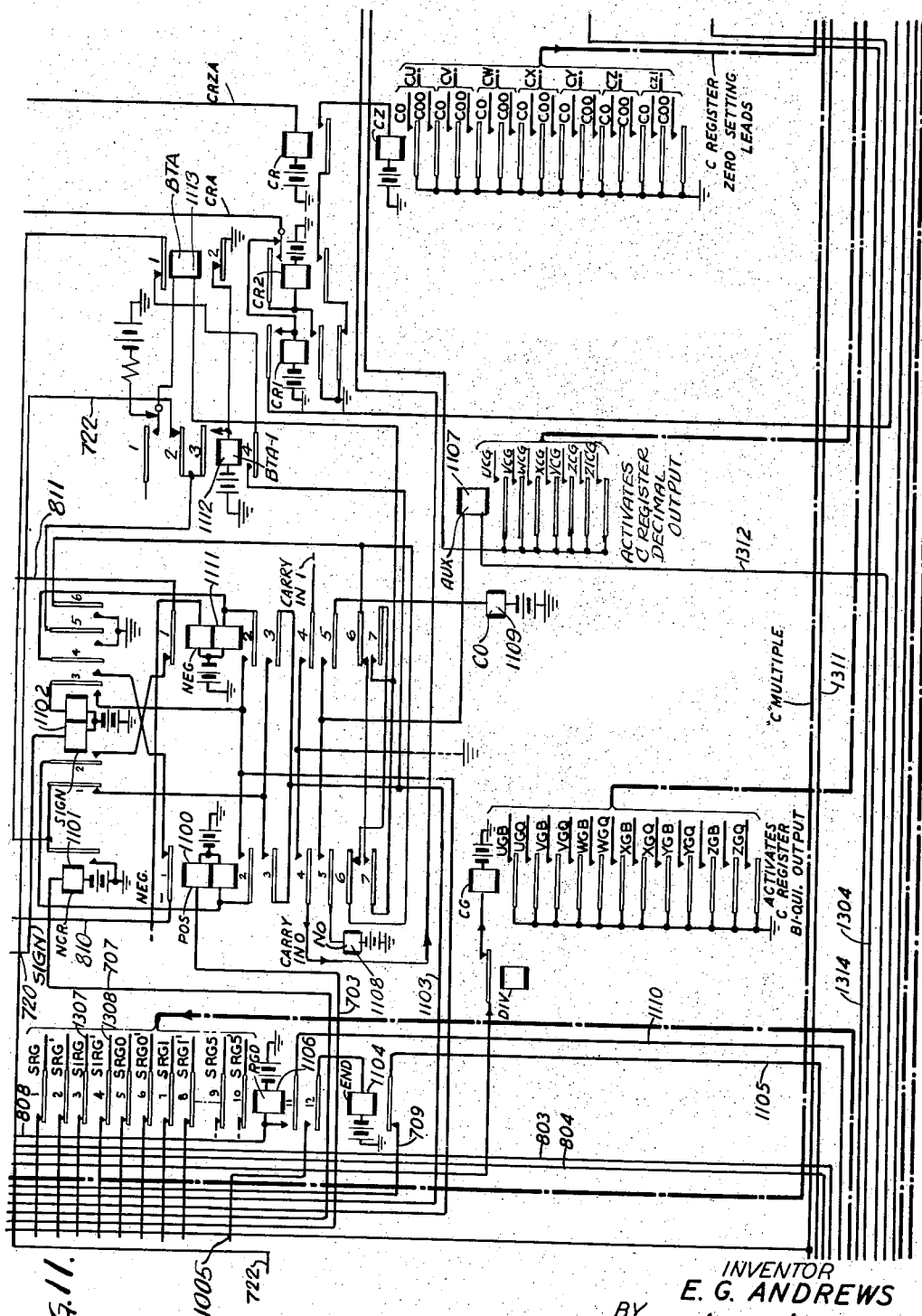
Figure 12:
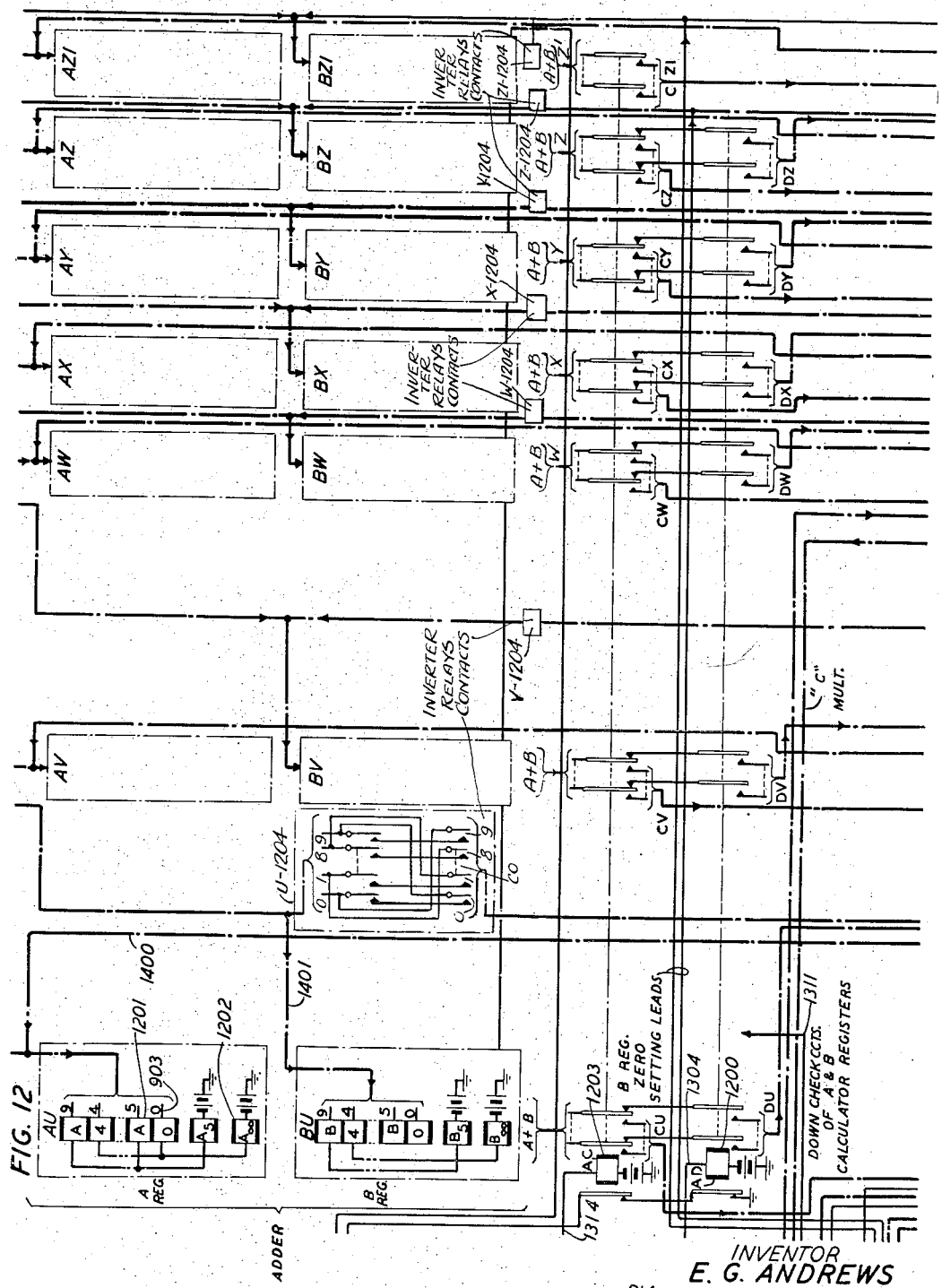
Figure 13:
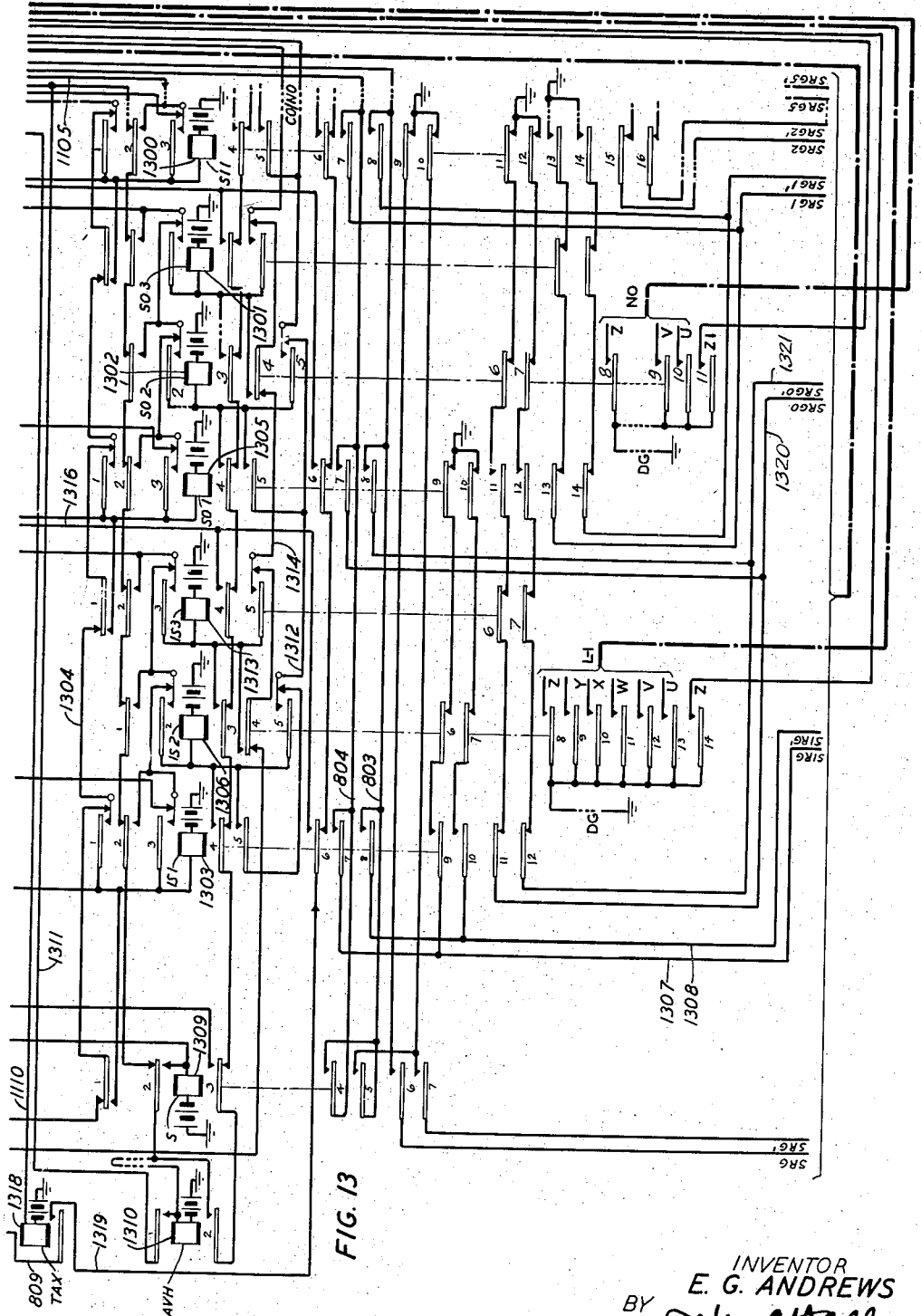

Fig. 7 indicates the master control circuit, shows in some detail the cut-in relays operated by particlular code orders issued by the master control, and shows sufficient detail of the "T" and "Q" registers for the purposes of the present description;

Fig. 8 shows the multiplier digit relays and the cut-in relays for connecting the output thereof to the multiplying relays;

Fig. 9 shows the multiplying relays;

Fig. 10 shows the start and end control relays of the steering circuit;

Fig. 11 shows the register ground cut-off and end relays, the sign control relays, the C register zero setting means and the C register activate relays whereby the information contained in such register may be read out in either the true decimal notation or the biquinary code;

Fig. 12 shows the adder and the sum placement relays which steer the sum to be derived either into the accumulator or the temporary storage register;

Fig. 13 shows some detail of the steering circuit; and

Figure 14:
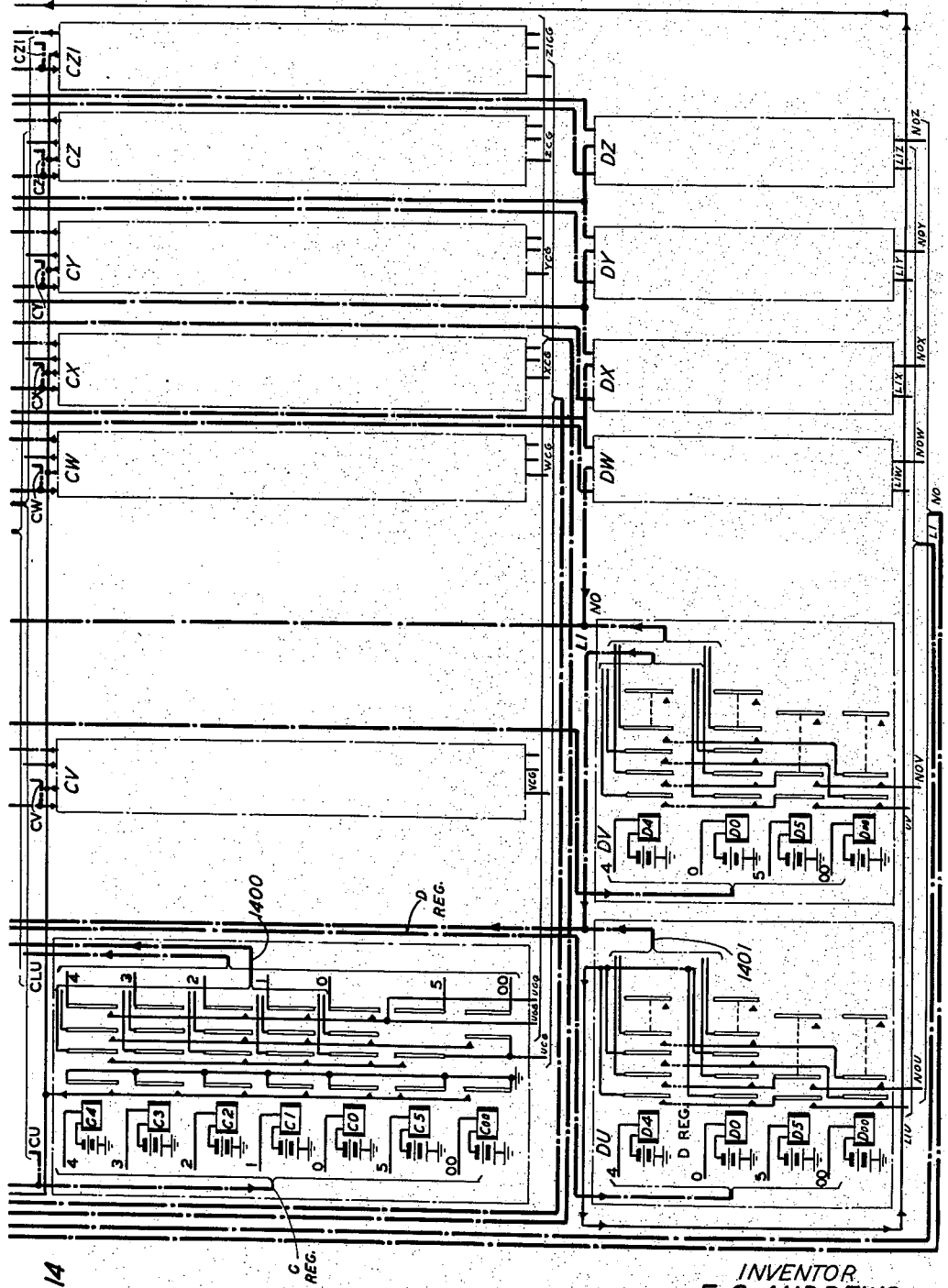

Fig. 14 shows the accumulator known as the C register and the temporary storage register, known as the D register.

Figure 17:
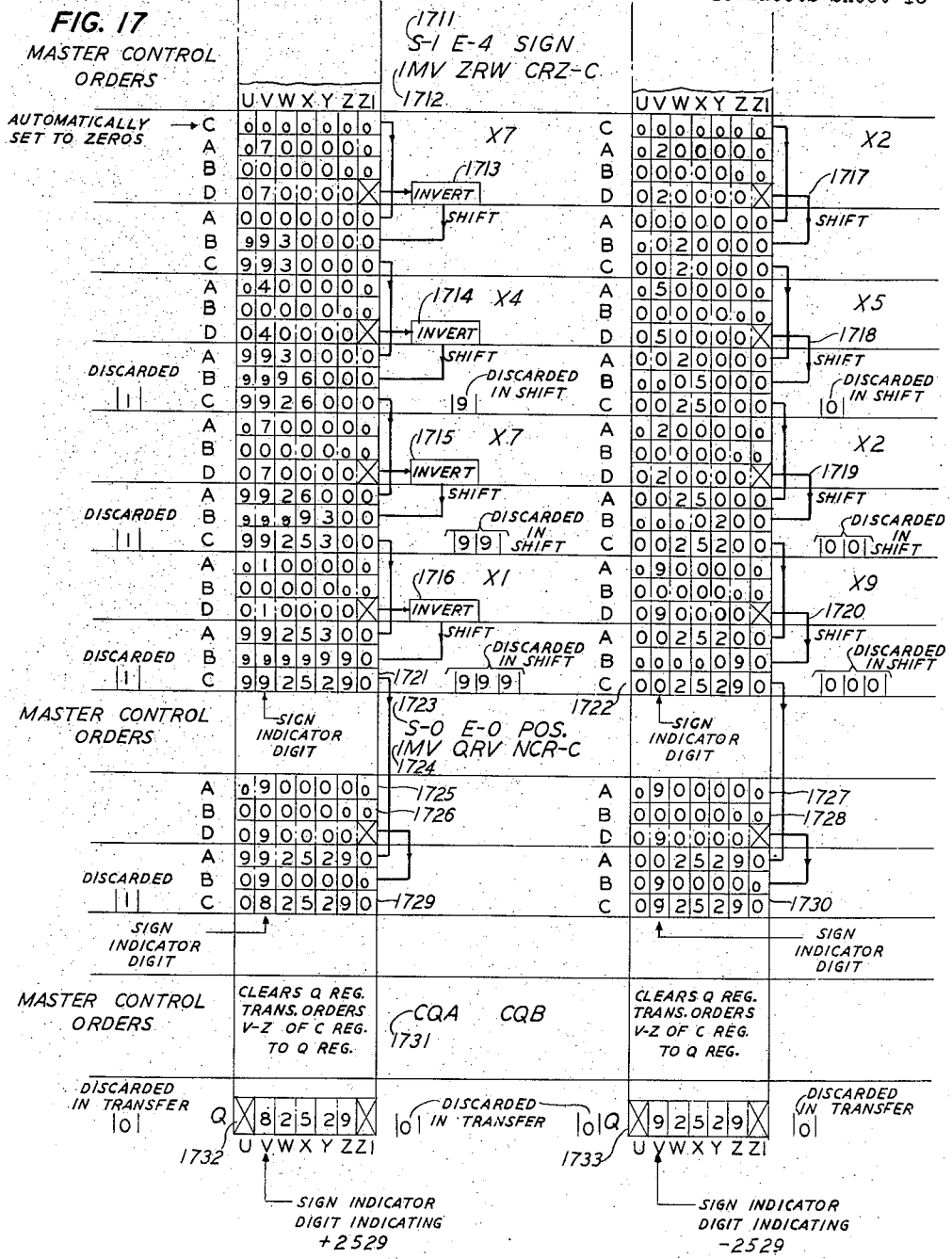

Fig. 15 is a block diagram showing how Figs. 16 and 17 may be placed to form a complete operational chart picturing two examples of the operation of the sign circuits during a multiplying operation.

Fig. 16 is part of an operational chart showing examples of the operation of the sign circuits when a multiplying operation is performed in which the signs of the multiplicand and the multiplier are not known.

Fig. 17 is part of an operational chart showing examples of the operation of the sign circuits when converting a number from its complementary form to its true or absolute form.

This application is one of a group of seven applications all based on the same arrangement. The Andrews-Vibbard application is a full and complete disclosure and includes a disclosure of the present invention, the other applications, including the present application being abbreviated disclosures of certain features of the complete device, as follows:

| Applicant | Serial No. | Filing Date | Subject |
|---|---|---|---|
| Andrews-Vibbard | 716,680 | December 17, 1946 | Automatic Calculator. |
| Vibbard | 716,827 | do | Control Circuit.[1] |
| Strickler | 716,783 | do | Testing System. |
| Juley | 716,793 | do | Switching Control System.[2] |
| Cesareo | 716,753 | do | Automatic Code Translating System.[3] |
| Cesareo-Strickler | 716,754 | do | Automatic Calculator. |

[1] Patent No. 2,671,611, granted Mar. 9, 1954.
[2] Patent No. 2,666,578, granted Jan. 19, 1954.
[3] Patent No. 2,625,328, granted Jan. 13, 1953.

The device in which the present invention is incorporated is a calculator operated by electrical circuit change in which each new circuit operation is dependent upon the successful completion of a previous operation. It consists essentially of a calculating arrangement, a plurality of tape transmitters of the kind commonly used in printing telegraph operation for entering both operational orders and mathematical information, a plurality of registers in which mathematical information from the tapes or calculated by the calculator may be stored temporarily and a printing device also of the type commonly used in the printing telegraph art for recording various items of information, including the arguments of the problems, partial results and the final solutions.

The particular features disclosed herein have to do primarily with the determination of the sign of a calculated factor in some equation. Where a plurality of factors enter into multiplication or division operations the sign of the final product or quotient is herein calculated by addition. Mathematical factors entered in the device from any one of the tapes are characterized as being positive or negative quantities by the character of the first digit, 0 being used for plus and 9 being used for minus. Thus a five-digit number 98765 represents the mathematical quantity −8765, a six-digit number 966666 represents the mathematical quantity −66666 and a six-digit number 053234 represents the mathematical quantity +53234.

The product (the first six significant digits) of these three quantities multiplied together is +311060, and will be calculated in accordance with the present invention as the number 8311060. First the three numbers 8765, 66666 and 53234 are multiplied together as though they were all positive numbers to produce the number 0311060 and then the three sign indicators 9, 9 and 0 are added together and the units digit of the sum (18) is placed in the first place of this number to produce the final number 8311060. As hereinbefore stated the odd or even characteristic of this first place digit is an indication of the negative or positive sign for the final product.

Within the limits for which the device of the present invention is arranged a first place digit will have the following significance:

9 indicates −
8 indicates +
7 indicates −
6 indicates +
0 indicates + and any derived quantity having one of these digits as a first digit used for further calculation or printed will operate the sign circuit accordingly. Thus if the derived number 8311060 is stored and then later used as a factor in some further calculation the first digit 8 being an even number will operate the positive relay. This will be more fully described hereinafter.

Figure 1:
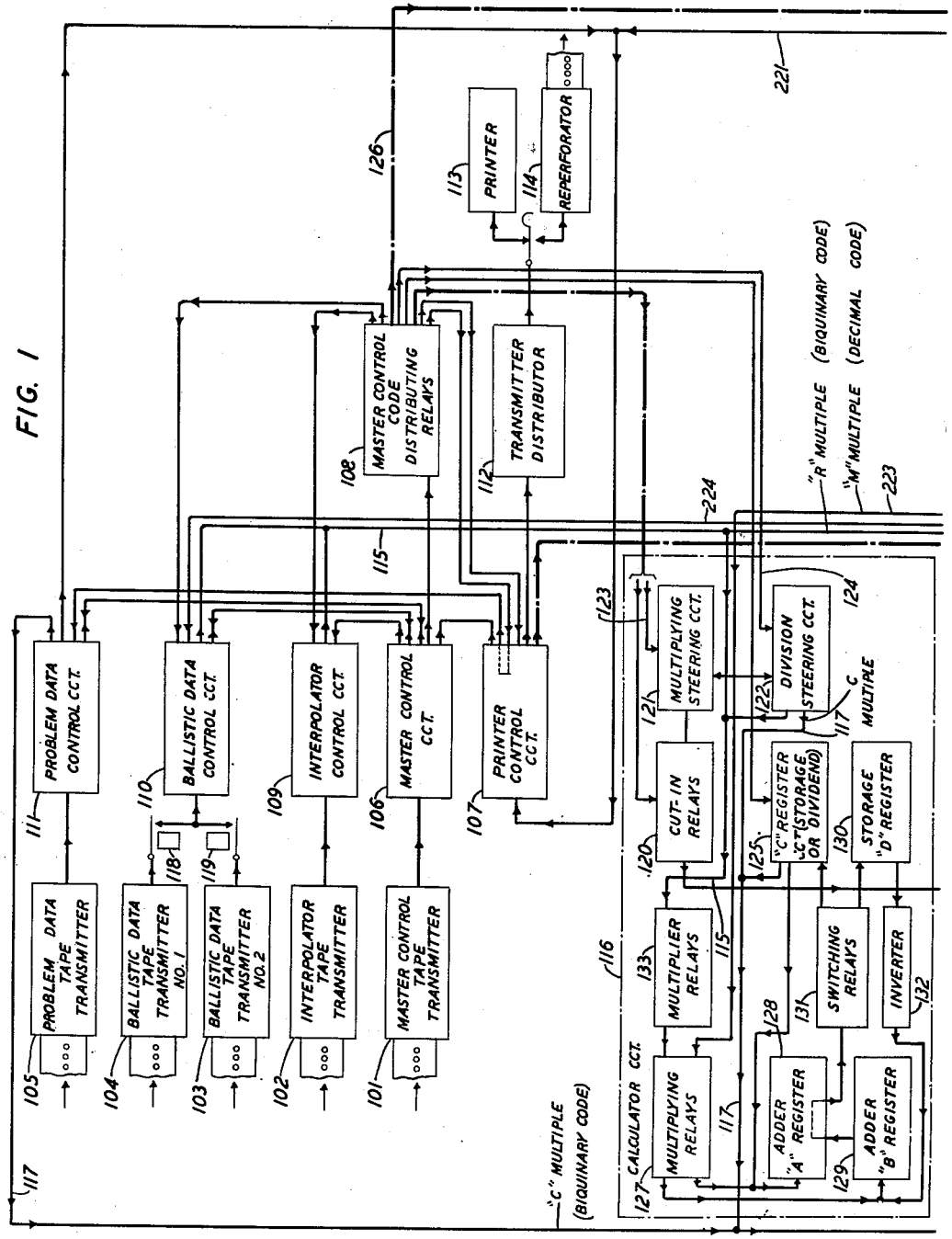
Figure 2:
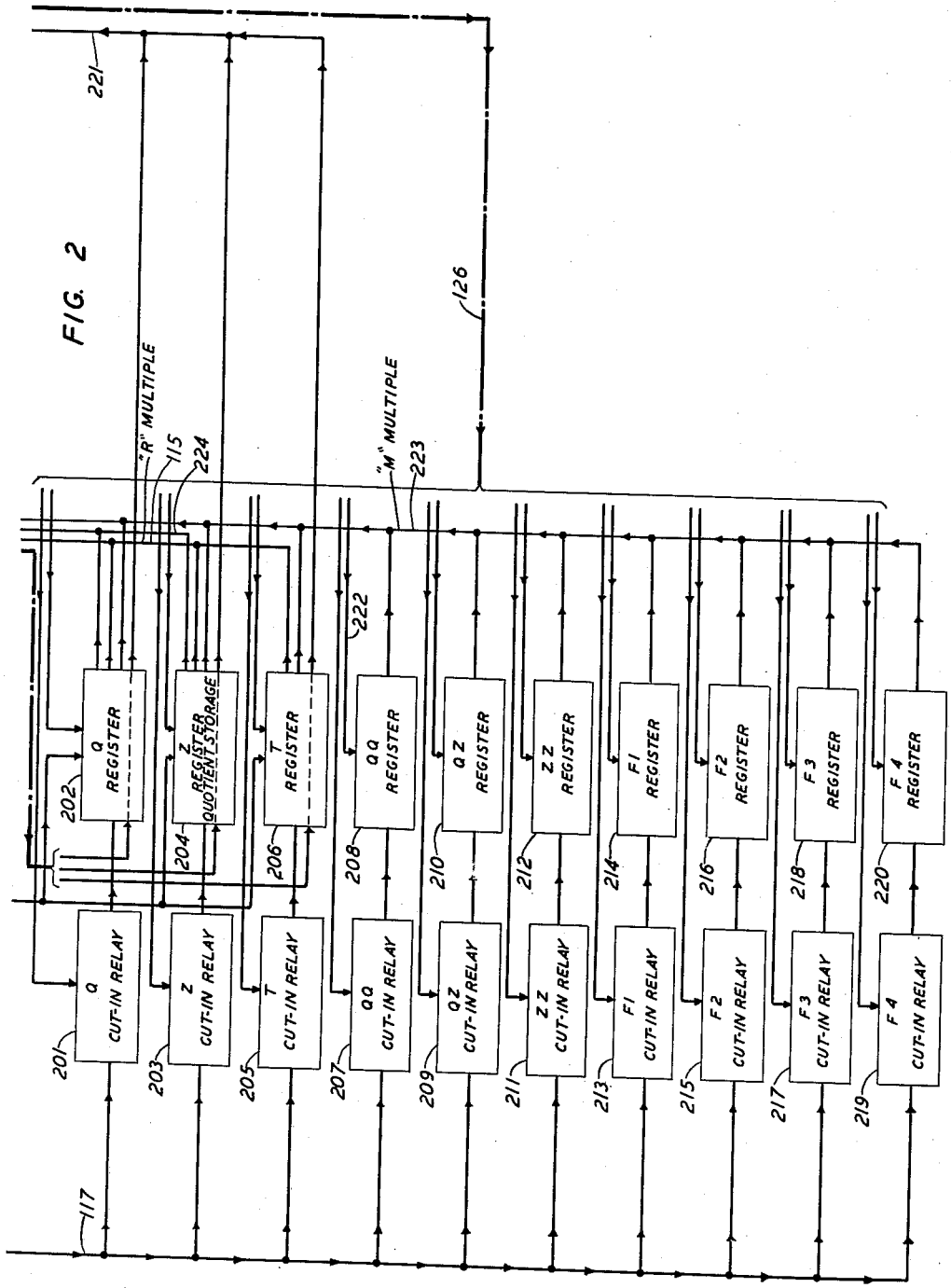

The means by which such calculations are performed are indicated by the flow chart contained in Figs. 1 and 2. In Fig. 1 there is shown a master control tape transmitter 101 which is used to transmit operational orders from a so-called routine tape into the master control circuit 106 which has general control over all the operations of the device. Other similar transmitters are the interpolator tape transmitter 102, the ballistic data tape transmitters 103 and 104 and the problem data tape transmitter 105, each with its control circuit. All of these transmit mathematical information from appropriate tapes and all of this information is generically problem data. That provided by the problem data tape constitutes the argument of the problem, that from the interpolator tape constitutes correlated or empirical data and that from the ballistic tapes constitutes table information or precalculated data such as is usually found in the so-called tables of functions such as trigonometric, logarithmic, ballistic and other such data. In the operation of this device the routine tape is operated cyclically, that is, it runs through its transmitter over one complete set of routine orders necessary for the calculation of a function from one given argument or set of arguments. The problem data tape usually contains a series of arguments and is moved forwardly step by step under control of the master control circuit, the master tape operating through one cycle for each argument. The remaining tapes contain necessary information and may be moved from point to point either forwardly or backwardly to transmit information called for by the master control from time to time during the calculating operations.

The calculator here generally shown as included in the broken line rectangle 116, consists primarily of four relay registers, the A register 128 constituting an augend element, the B register 129 constituting an addend element and the C register 125 and D register 130 being used alternatively as sum elements. All problems presented to the calculator are in the form of problems in multiplication and the calculation is actually performed by summing the values registered at various times in the A and B registers. For this purpose a set of multiplying relays 127 and a set of multiplier relays 133 are provided by means of which a multiplicand operating the multiplying relays 127 may be multiplied by one digit at a time of the multiplier which operates the multiplier relays 133. There is provided a set of switching relays 131 for determining into which register, the C register 125 or the D register 130 the values in the A and B registers shall be summed. Values stored in the D register 130 may be transferred only to the B register 129, by way of an inverter 132. This is a means by which the value being transferred from the D register to the B register may be transferred as it is or in its complemental form. Values stored in the C register 125 may be transferred either to the A register or transmitted out over the C multiple 117 for transfer to any one of the various registers shown in Fig. 2.

The calculator 116 is under general control of a steering circuit 121 which controls the various steps in a multiplying calculation cycle. When a problem in division is presented an additional circuit, the division steering circuit 122 is brought into action to make the necessary changes and alterations in the calculating cycle. The cut-in relays 120 ordered into operation by the master control circuit 106 through the code distributing relays 108 operate to activate one decimal denominational order at a time of certain registers which then transmit over the R multiple 115 to operate the multiplier relays under control of the steering circuit 121. The division steering circuit, ordered into operation over the path 124, besides modifying the calculation cycle provides a supply of multiplier digits over the R multiple 115 to the multiplier relays 133 as trial quotient digits and transmit the correctly calculater quotent digits over the C multiple 117.

The novel combinations of the present invention concern generally the arrangements for recording the end results of the calculations. In a specific embodiment of the invention such calculated numbers are temporarily deposited in the T register, from which the printer control circuit 107 orders them translated and transmitted by the transmitter-distributor 112 to either the printer 113 or the reperforator 114. It may be noted that the reperforator may be used to prepare table tapes, that is, the calculating device may be used to calculate values of ballistic constants or other values which will be used in solving other problems so that by transmitting the calculated information to the reperforator 114 instead of to the printer 113, a tape may be prepared suitable for use in one of the table tape transmitters such as one of the ballistic tape transmitters. Of course, such a tape at any time thereafter may be run through a tape transmitter and a printer to produce a printed record of the calculated information.

A particular operation which may be carried out is one in which one or any number less than the whole number of digits stored in a register may be taken out for use in calculation. This is indicated by the line from the cut-in relays 120 to the Q, Z and T registers 202, 204 and 206, respectively. Each of these registers will transmit into either the "R" multiple 115 for use as multipliers or into the "M" multiple 223 for use as multiplicands.

Figure 3:
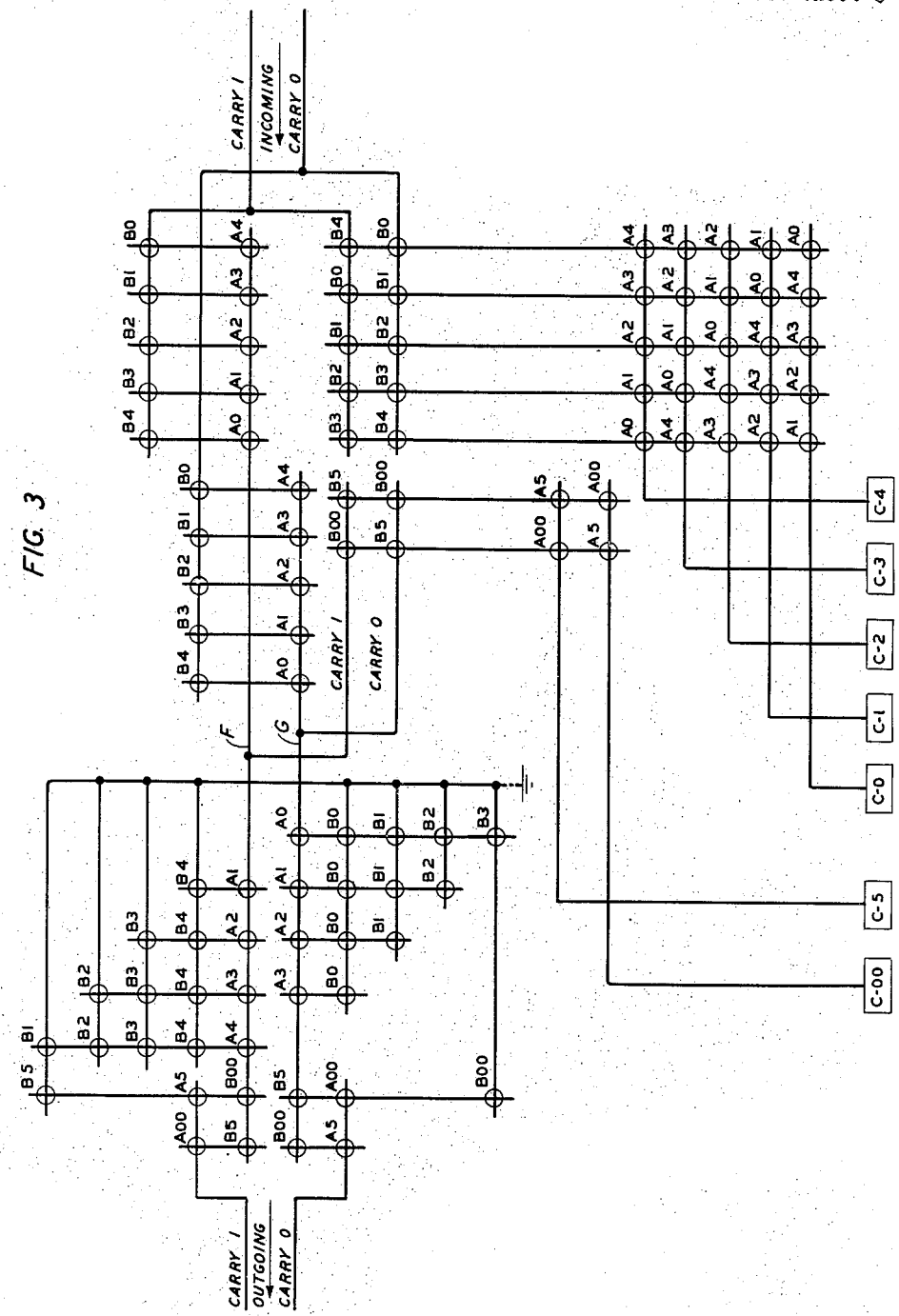
Fig. 3 is a shorthand schematic circuit diagram showing the fundamental circuits for biquinary summation.

In Fig. 1 the "R" multiple is designated "biquinary code" and the "M" multiple is designated "decimal code." The latter needs no explanation. The former may be explained shortly by the aid of Fig. 3. This is a shorthand schematic circuit diagram designed to show in the simplest manner the fundamental scheme of biquinary summation. A biquinary set of relays consists of seven relays divided into a binary group of two relays designated 00 and 5 and a quinary group of five relays designated 0, 1, 2, 3 and 4. Any one of the ten digits may be represented by selective operation of one relay from each group, the value of the digit being equal to the sum of the designations of the said two relays. Fig. 3 shows a single decimal denominational order and indicates the contacts only of the biquinary relays of the A register, the contacts only of the biquinary relays of the B register and the windings only of the biquinary relays of the C register.

In the drawing, Fig. 3, the contacts of a relay are represented by a small circle drawn about the point where one conductor crosses another. This indicates that when the relay whose designation is placed above and to the right of such circle is operated a connection is made between such conductors. Thus if relay B0 and relay A0 are operated a connection will be established between the incoming carry 0 conductor and the C0 relay and likewise a connection will be simultaneously established between the incoming carry 1 conductor and the C1 relay so that which one of these relays is to be operated will depend on which one of the incoming carry leads is grounded (electrically characterized).

A summing arrangement constitutes essentially an augend register having a plurality of decimal denominational orders, an addend register having a like number of orders and a set of sum leads outgoing therefrom. There must be carry leads between the decimal orders since even though the values within the orders are expressed in code, the carry between orders is on a decimal basis.

Biquinary addition, considering a single decimal denominational order, consists of the summing of an augend, an addend and an incoming carry from a preceding decimal denominational order to find a sum expressed as a digital value and a decimal carry to a succeeding decimal denominational order. Only digital values are expressed by the coded operation of the sum relays and hence if the sum of the incoming carry, the augend and the addend exceeds 9, the sum relays will express only the units digit of such sum while the tens digit thereof is expressed as an outgoing carry. By way of example the following combinations (out of the two hundred possible combinations) will illustrate the summing pattern employed:

| Incoming Carry | + | Augend | + | Addend | = | Outgoing Carry | + | Sum |
|---|---|---|---|---|---|---|---|---|
| 0 | | 3 | | 1 | | 0 | | 4 |
| 0 | | 6 | | 6 | | 1 | | 2 |
| 0 | | 4 | | 2 | | 0 | | 6 |
| 0 | | 9 | | 2 | | 1 | | 1 |
| 1 | | 2 | | 6 | | 0 | | 9 |
| 1 | | 6 | | 7 | | 1 | | 4 |
| 1 | | 2 | | 2 | | 0 | | 5 |
| 1 | | 8 | | 8 | | 1 | | 7 |

Further, to explain the matter of biquinary addition, there is what might be termed an intersubgroup carry. Whenever the sum expressed by the sum relays is 0 to 4 there will be an intersubgroup carry of 0 and whenever such sum is 5 to 9 there will be an intersubgroup of 1.

The intersubgroup carry of 0 may result in the operation of either the binary relay (C00) weighted 0 or the binary relay (C5) weighted 5, and likewise the intersubgroup carry 1 may result in the operation of either (C00) or (C5). This statement may be easily checked in the next table wherein the operated augend relays (A), the operated addend relays (B) and the intersubgroup carries (listed as "binary carry") are shown.

*Schematic of biquinary addition*

| Carry in | Value | Represented by Operation of Relays | Value | Represented by Operation of Relays | Binary Carry | Value Digits | | Represented by Operation of Relays | Carry out |
|---|---|---|---|---|---|---|---|---|---|
| | | | | | | T | U | | |
| 0 | 3 | B00 B3 | 1 | A00 A1 | 0 | | 4 | C00 C4 | 0 |
| 0 | 6 | B5 B1 | 6 | A5 A1 | 0 | 1 | 2 | C00 C2 | 1 |
| 0 | 4 | B00 B4 | 2 | A00 A2 | 1 | | 6 | C5 C1 | 0 |
| 0 | 9 | B5 B4 | 2 | A00 A2 | 1 | 1 | 1 | C00 C1 | 1 |
| 1 | 2 | B00 B2 | 6 | A5 A1 | 0 | | 9 | C5 C4 | 0 |
| 1 | 6 | B5 B1 | 7 | A5 A2 | 0 | 1 | 4 | C00 C4 | 1 |
| 1 | 2 | B00 B2 | 2 | A00 A2 | 1 | | 5 | C5 C0 | 0 |
| 1 | 8 | B5 B3 | 8 | A5 A3 | 1 | 1 | 7 | C5 C2 | 1 |

In this figure the incoming carries are shown as the carry 1 and carry 0 leads coming in from the right, the outgoing carries are shown as the carry 1 and carry 0 leads going out at the left and the intersubgroup carries are shown as carry 1 (F) and carry 0 (G) leads in the center of the diagram. When any A or B relay is operated a connection will be made at the crosspoint indicated by a circle drawn at the crossing of two conductors and labeled with the designation of the relay. Thus following the carry 0 lead in from the right and then in a downwardly direction this conductor first crosses another vertically downward extending conductor at a point denoted by a small circle marked B0. This is an indication that when the relay B0 is operated a connection will be made by an armature and contact of this relay between these two conductors shown crossing each other at this point.

As an example, let us take the first addition listed in the table above. With an incoming carry 0 and with relays B00, B3, A00 and A1 listed as operated, the following circuits will be established. First, a circuit from the incoming carry 0 lead through closed contacts of relays B3 and A1 to the winding of relay C4, second, from the incoming carry 0 lead through the conductor extending upwardly and then to the left, closed contacts of relays B3 and A1, conductor G which constitutes the intersubgroup carry 0 lead, thence through the closed contacts of relays B00 and A00 to the winding of relay C00 and third, from the local ground (center) toward the extreme left and through the closed contacts of relays B00 and A00 to the outgoing carry 0 lead. Thus relays C00 and C4 are operated to express the digital value 4 and the outgoing carry 0 lead is electrically characterized to carry 0 into the next decimal denominational order.

As another example, and to point out a different type or pattern of connections let us take the last addition listed in the above table. With an incoming carry 1 and with relays B5, B3, A5 and A3 listed as operated the following circuits will be established. First, a circuit from the incoming carry 1 lead through closed contacts of relays B3 and A3 to the winding of relay C2, second from the local ground through closed contacts of relays B3 and A3, conductor F (constituting the intersubgroup carry 1 lead) through the closed contacts of relays B5 and A5 to the winding of relay C5 and third, from the local ground toward the extreme left and through the closed contacts of relays B5 and A5 to the outgoing carry 1 lead. Thus relays C5 and C2 are operated to express the digital value 7 and the outgoing carry 1 lead is electrically characterized to carry 1 into the next decimal denominational order.

It will thus be seen that in some cases the ground for operating the binary C relays comes from the incoming carry lead and in other cases from a local ground. An examination of this figure will show a certain regularity in pattern which will render the tracing of circuits therethrough a very simple matter. The remaining examples of addition in the above table may be readily checked. It will also be noted that the examples of addition given therein are selected with a view toward showing all the various combinations of the three carries, i. e., the incoming carry, the intersubgroup carry and the outgoing carry.

When it is desired to transmit from one register to another the complement of the number stored in the first register, the code is inverted. If we are transmitting from the D register 130 by way of example through the inverter 132 to the B register 129 and the code is to be inverted, then an operated relay in the D register will cause a relay in the B register to be operated in accordance with this pattern.

D00 will cause operation of B5
D5 will cause operation of B00
D0 will cause operation of B4
D1 will cause operation of B3
D2 will cause operation of B2
D3 will cause operation of B1
D4 will cause operation of B0

Thus the digit 3, for example, registered in the D register by the operation of relays D00 and D3 will be registered in the B register as the digit 6 through the operation therein of relays B5 and B1. 6 is the nine's complement of 3.

Figure 4:
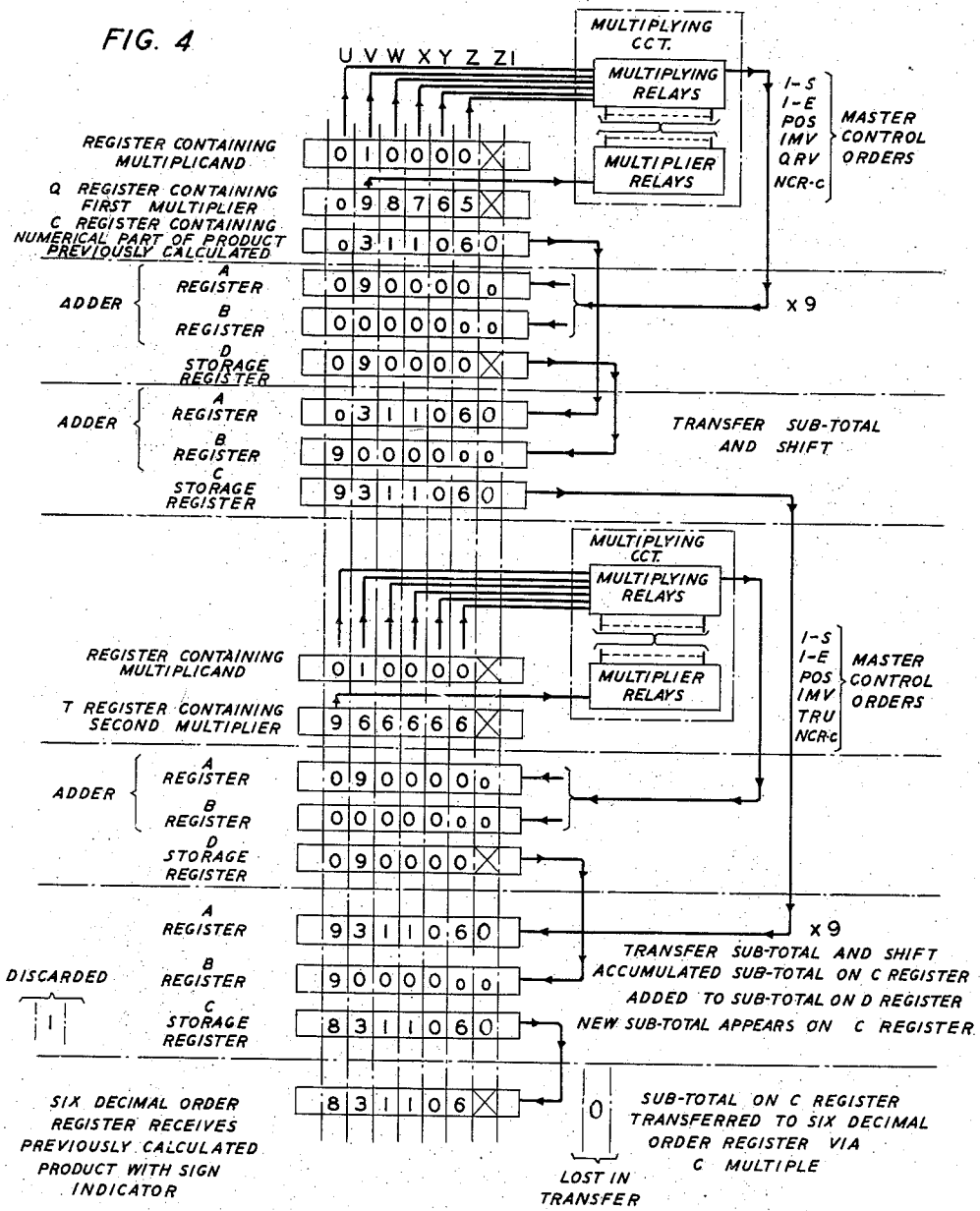
Fig. 4 is a combination block diagram and schematic circuit flow chart showing the fundamental conception of how the sign of a calculated and accumulated quantity may be derived by calculation and added to the said accumulation.

The operations in which we are particularly interested are pictured in Fig. 4. Here a number of registers are shown as a file of long rectangles laid over a columnar arrangement showing seven decimal denominational orders marked at the top as U, V, W, X, Y, Z and Z1. Most of the registers are shown a number of times so that this showing is more in the nature of an operational chart than a schematic diagram. It is intended to show the manner in which the number 8311060 is derived from the three factors 98765, 966666 and 053234.

The manner in which the numerical parts i. e., 8765, 66666 and 53234 of these three factors are multiplied together is fully explained in the Andrews-Vibbard application and is of no particular interest here except to note that this product 311060 has been derived and is registered in the V to Z1 orders respectively of the C register. The U order of the C register has been reserved for summing the digits representing the signs of the factors.

Now in accordance with the manner in which the device is operated and as explained fully in the said Andrews-Vibbard application the master control tape will transmit two master codes in succession the first master code being one which will set the steering circuit to operate in a particular way and which will affect certain circuits coded as follows:

I-S, I-E, POS and the second master code being one which will start the calculating operations by affecting certain circuits coded as follows:

IMV, QRV, NCR-C

The significance of these codes is as follows:

I-S sets the steering circuit to shift the product of a multiplication one place to the left. This means that when the digit 1 in the V order of a multiplicand is multiplied by 9 the product will be summed into the U order of the sum register. I-E causes the steering circuit to end the multiplication operations when the last multiplier digit has used the I-S shift relay.

The practical result of using these two codes I-S and I-E is that only one digit of a factor is used as a multiplier digit. Hence where the factor 98765 is registered, let us say in the Q register the first digit 9 (which indicates a negative sign) may be used as a multiplier digit and the other digits ignored. As hereinbefore pointed out and as explained in detail in the said Andrews-Vibbard application, the mathematical operation of addition is entered into the calculator in the form of problems in multiplication and is actually performed by summing the values registered at various times in the A and B registers of the calculator. Therefore, to add the first digit 9 of the factor 98765 to the derived product registered in the C register as shown in Fig. 4, this digit is used as a multiplier in a multiplying operation in which a multiplicand of 1 is synthetically produced by the IMV code as explained hereinafter and the derived product registered in the A and B registers of the calculator. This multiplying operation of 9×1=9 effectively enters the digit 9 into the calculator so that it may be added to the factor registered in the C register in the desired columnar relationship.

POS sets the steering circuit to indicate that the multiplier is positive. It is pointed out that the first digit 9 of the factor 98765 registered in the Q register, although indicating that the numerical value 8765 is negative, the numeral 9 in the first order position is itself a positive number and when used to determine the sign of a product, as described herein, is so used by the calculating equipment and thus requires a positive (POS) setting of the steering circuit.

After the first master code has been transmitted to set the steering circuit in this manner it will be advanced by a satisfaction signal indicating that the ordered arrangements have been properly made. The significance of the next three codes is as follows:

IMV is a synthetic multiplicand set up by a special relay and which sets the multiplying relays to 0 in each decimal denominational order thereof except the V order which it sets to 1. In the drawing, Fig. 4, the uppermost register representation marked "register containing multiplicand" is shown as a source of a six-digit multiplicand of 010000 because this operation can best be visualized in this way. Most multiplicands are taken from registers in this manner.

QRV is a code which will cause the number in the Q register to be used as a multiplier beginning with the digit in the V order thereof. Since the steering circuit has been set to use only one digit of this number as a multiplier it follows that the digit 9 in the V order of the Q register will be used as a multiplier.

NCR-C is a code which sets the steering circuit to add the product of a current multiplication to a number previously accumulated and now registered in the C register.

Thus it will be seen that when the master code for these three codes is signaled the number 0311060 now in the C register is left undisturbed, the multiplying relays are set to 010000 and the multiplier relays are set to the digit 9. Thereupon the units digits of the products of the multiplicand digits by the multiplier digit are transmitted to the A register and, as shown, appear there as 0900000. Likewise the tens digits of the products of the multiplicand digits by the multiplier digit shifted one place to the left in respect to the units digits thereof are transmitted to the B register and, as shown, appear there as 0000000. These values are now summed into the D register and, as shown, appear there as 090000 (the D register has no ZI order).

When the C register and the D register are both filled, then the A and B registers are cleared and the value in the C register is transmitted without shift or inversion to the A register and the value in the D register is transmitted subject to both shift and inversion to the B register where they are then summed into the C register. In the present case the value in the D register is shifted one place to the left (code I-S) but is not inverted (code POS) in its transmission to the B register. The sum which now appears in the C register is therefore 9311060. When this operation is complete the master control circuit is advanced and will now transmit two master codes for

I-S, I-E, POS
IMV, TRU, NCR-C

The first sets the steering circuit as hereinbefore described and the second starts the calculation, this time using the single digit in the U order of the T register as a multiplier. The operations now are practically identical with those above described with the practical result that the digit 9 in the U order of the C resgister is changed by the addition of another 9 to 8 (the tens digit 1 being discarded) so that the result appears as 8311060.

Thus far, the sign indicator digits of two of the three factors have been summed and entered in the U order of the C register which, as hereinbefore indicated, was reserved for the sign indicator digit of the product of the three factors. The sign indicator digit 0 for the factor +53234 must now be added to the digit recorded in the U order of the C register. The final result is apparent for 8+0=8. When the operation for the first two sign indicator digits is completed, the master control circuit is advanced and will now transmit two master codes for

I-S, I-E, POS
IMV, ZRU, NCR-C (assuming that the number 053234 is now in the Z register).

The first master code sets the steering circuit as hereinbefore described and the second master code starts the calculation. In this case 0 will be used as a multiplier and since any quantity multiplied by 0 is 0, means have been provided, as explained hereinafter, to advance immediately without going through the motions of operating the multiplying relays and for ending the operation. Thus the sign indicator digit registered in the U order of the C register remains unchanged and the final result in the C register appears as 8311060.

This indicates that the result of multiplying the factors (—8765) (—66666) and (+53234) together is a quantity (+311060). It may further be noted that the number 8311060 if not used immediately but is transferred to some six-decimal order register will lose its last right-hand digit for generally only the A, B and C registers have a ZI order.

Figure 5:
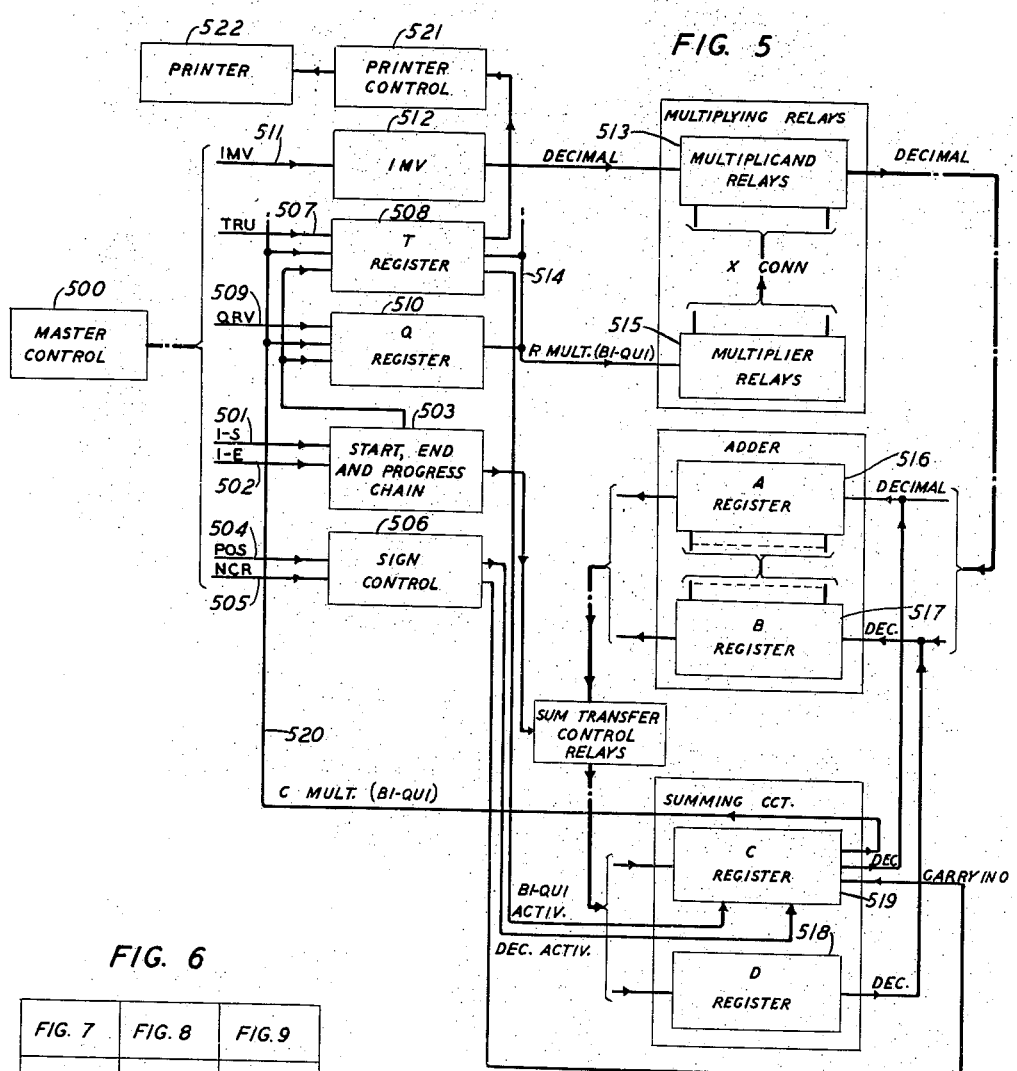
Fig. 5 is a block diagram showing how the various components of the device are operated to perform this operation of determining the sign of a quantity by calculation.

The same story may be told in another manner by the aid of the flow chart Fig. 5. Here the master control circuit 500 is shown as the source of the various coded orders above described. The codes I–S and I–E are transmitted over conductors 501 and 502, respectively, to the start and end relays of the steering circuit 503. The POS and the NCR–C codes are transmitted over the conductors 504 and 505 to the sign control circuit 506. The TRU code is transmitted over conductor 507 to the T register 508 and the QRV code is transmitted over conductor 509 to the Q register 510. And lastly the IMV code is transmitted over the conductor 511 to the IMV relay here indicated by rectangle 512 to in turn control the multiplying relays 513. A multiplier digit derived from either the T register 508 or the Q register 510 is transmitted over the R multiple 514 to the multiplier relays 515. With the multiplying relays 513 and the multiplier relays 515 operated the A register 516 and the B register 517 are filled and summed into the D register 518. Thereupon the values in the C register 519 and the D register 518 are transferred to the A register 516 and the B register 517 respectively and then summed into the C register 519. The final accumulation may under proper orders from the master control circuit be transmitted over the C multiple 520 for registration in any given register such as the T register 508. Also under proper orders from the master control circuit the value stored in the T register may be transmitted to the printer control circuit 521 and printed by the printer 522.

In the following description of the detailed operations given with reference to Fig. 7 through Fig. 14 of the drawings, it will be assumed that the master control orders I–S, I–E, POS and IMV, QRV, NCR–C have been carried out and that the value 9311060 has been accumulated and is now registered in the C register. When the satisfaction signal, whose nature and manner of transmission and so forth is fully described in the said Andrews-Vibbard application, is received by the master control circuit 709, this device will then proceed to issue the orders characterized by the codes

I–S, I–E, POS

This will consist of placing ground on conductor 701 extending to the I–S relay 1000, conductor 702 extending to the I–E relay 1001, and conductor 703 extending to the POS relay 1100. This sets the steering circuit to control a single multiplying operation with a positive multiplier digit.

Now the steering and the sign circuit having been set the next orders are issued by the master control circuit, as

IMV, TRU, NCR–C resulting in the grounding of leads 705, 706 and 707.

The grounding of lead 705 will cause the operation of the IMV relay 800 which thereupon causes the operation of the U0 multiplying relay 900, the V1 multiplying relay 901, the W0 multiplying relay 902, and the X0, Y0 and Z0 multiplying relays (not shown). This sets up the multiplying relays to express the multiplicand 010000.

The grounding of lead 706 will cause the operation of the TRU relay 708 thus extending the RG leads into the circuits of the T register as will be more fully described shortly.

The grounding of lead 707 will cause the operation of the NCR relay 1101 which thereupon starts the calculating cycle. Relay NCR, operated, extends ground over armature 1 and back contact of SIGN relay 1102, front contact and armature 3 of POS relay 1100, conductor 1103, armature 13 and front contact of TRU relay 708 to the chain start ground lead 709, the back contact and armature of the END relay 1104, conductor 1105, through the steering chain circuit indicated by the dotted line leading to the normal contacts of armature 3 of the SI–1 relay 1300, and thence through armatures and contacts of non-operated relays SI, 1002, S0–3, 1301, S0–2, 1302, and so forth to armature 13 and front contact of operated I–S relay 1000, winding of I–S–1 relay 1303. Relay 1303 operates and extends this chain start ground over its armature 1 and front contact to the AD conductor 1304, leading to the AD relay 1200. The AD relay connects the sum leads from the A and B registers to the relays of the D register.

The IS–1 relay 1303 now grounds the RG leads. Ground on the back contacts and armatures 9 and 10 of S0–1 relay 1305 is extended over the back contacts and armatures 6 and 7 of IS–2, relay 1306 and the front contacts and armatures 9 and 10 of IS–1, relay 1303 to the SIRG lead 1307 and the SIRG' lead 1308, respectively. These leads may be traced through armatures 3 and 4 and back contacts of RG0 relay 1106, armatures 1 and 2 and front contacts of I–E relay 1001, armatures 1 and 2 and front contacts of I–S relay 1000 to RG1, lead 1003 and RG1', lead 1004, respectively, thence through armatures 1 and 2 and front contacts of TRU relay 708, to place grounds on the lead 710 of the armatures of the quinary relays and the lead 711 of the armatures of the binary relays of the T register.

It has been assumed that the value 966666 is registered in the T register and consequently the TU5 relay 712 and the TU4 relay 713 of this U order are operated to express the digit 9. Consequently the RG grounds will be extended over conductors 714 and 715, respectively, to operate the multiplier relays 801 and 802, respectively. Relay 801 locks to conductor 803 and relay 802 locks to conductor 804, which conductors are connected by the front contacts and armatures 8 and 7 of IS–1 relay 1303 to the grounded conductors 1308 and 1307, respectively. This locking circuit will hold the multiplier relays because any one of them will operate the RG0 lead going to the RG0 relay 1106 to open their original circuits.

The multiplier relay 802 places grounds on conductors leading through armatures of the 05 relay 801 to the 9 conductor for the U order and the 9 and 9' conductors for the V, W, X, Y and Z orders of the multiplying relays. By way of example the 9 conductor 805 of the U order may be traced through armature 3 and front contact of U0 multiplying relay 900 to the 0 conductor (9 ×0=0) 903 to operate the A0 relay 1201 and the A00 relay 1202 in the U order of the A register, to express 0 therein.

In a similar manner the relays of the other orders of the A and B registers will be operated so that the following pattern of values will be expressed

|   | U | V | W | X | Y | Z | Z1 |
|---|---|---|---|---|---|---|----|
| A | 0 | 9 | 0 | 0 | 0 | 0 | 0  |
| B | 0 | 0 | 0 | 0 | 0 | 0 | 0  |

The AD relay 1200 being operated, the sum of these values will now be registered in the D register in accordance with the pattern of biquinary summation explained in connection with Fig. 3, so that the D register is now set to express

|   | U | V | W | X | Y | Z |
|---|---|---|---|---|---|---|
| D | 0 | 9 | 0 | 0 | 0 | 0 |

Now in accordance with the full explanation in the said Andrews-Vibbard application but of little importance here an up-check circuit will be closed when the four registers A, B, C and D are thus properly set. This is herein expressed as a dotted line in Fig. 13 leading from armature 2 of S relay 1309 to the winding of the AVH relay 1310 so that if and when these four registers are properly set, the AVH relay 1310 will be operated. This starts the second calculating interval in which the IS-1 and IS-2 relays are concurrently operated. Upon the operation of the AVH relay 1310 the chain start ground is extended over the front contact and armature 2 of relay 1310, armature 3 and back contact of S relay 1309, armature 4 and front contact of IS-1 relay 1303 to the winding of IS-2 relay 1306 which now operates. The AVH relay locks through its armature 1 to the AVH lead 1311 which connects to the down-check circuit of the A and B registers, a circuit which will remain grounded as long as there is a single relay in either of these registers operated. In the meantime the operation of the IS-2 relay cuts ground off conductors 1307 and 1308 whereby the multiplier relays are released and this in turn releases the relays of the A and B registers. As soon as all the relays in these registers have returned to normal the connection from conductor 1311, the armature and front contact of AVH relay to the winding of this relay is opened and it releases in turn releasing the IS-1 relay 1303.

This is the beginning of the third interval in the calculating cycle. Now the C0/N0 lead 1312 is grounded and this operates the AUX relay 1107 in series with either the N0 relay 1108 or the C0 relay 1109, in this case the normal relay 1108 since the POS relay 1100 is operated. N0 relay 1108 and C0 relay 1109 shown in Fig. 11, are representative of the N0 and C0 relays in the transfer leads between the D and B registers in the U, V, W, X, Y, Z and Z1 orders of the calculator. The contacts of these N0 and C0 relays are shown in Fig. 12 where, for example, in the dotted line rectangle U-1204 the contacts only of the N0 and C0 relays of the U order of the calculator are shown in simplified schematic form. The dotted line rectangles V-1204 through Z1-1204 shown in Fig. 12 indicate the contacts of the N0 and C0 relays of the V through Z1 orders of the calculator, respectively. As described above, the value 090000 is registered in the D register and because the POS relay 1100 and the N0 relays represented by relay 1108 are operated, this value 090000 will be transferred without inversion from the D register to the B register. The AUX relay closes a circuit from ground, back contact and armature 1 of the AD relay 1200, back contact and armature of the A. C. relay 1203, the armatures and front contacts of the AUX relay 1107 to the CG leads whereby the registration in the C register is now transmitted over the path 1400 to the A register. Likewise the DG lead is closed so that armatures 8 to 14 of the IS-2 relay are grounded and hence the registration in the D register is transmitted over path 1401 to the B register.

Again when the four registers of the calculator are properly set the combined up-check circuit will cause the operation of the AVH relay 1310 and this in turn will cause the operation of the IS-3 relay 1313. With the operation of relay 1313 the A. C. lead 1314 leading to the A. C. relay 1203 is grounded and relay 1203 is operated to connect the summing leads from the A and B registers to the C register so that the values just transferred to the A and B registers may be summed into the C register. The IS-2 relay is held by the down-check circuit of the C and D registers and these registers are released by the A. C. relay (the locking circuits for the C and D registers under control of the A. C. relay are fully explained in the said Andrews-Vibbard application). When the C and D registers are fully released, then the IS-2 relay 1306 is released. During the period when the IS-3 relay 1313 of the steering chain only is operated the C register will be set in accordance with the values in the A and B registers. When the C register is completely set the combined up-check circuits of the A, B and C registers will again cause the operation of the AVH relay 1310. In this instance the ground now applied to armature 4 of IS-3 relay 1313 will be extended over the front contact thereof, conductor 1316, armature 3 and front contact of 1-E relay 1001, conductor 1005, front contact and armature 12 of RG0 relay 1106, winding of END relay 1104 to battery. Relay 1104 operates and ends the operation of the steering chain. The END relay 1104 also transmits (by circuits not shown here) a satisfaction signal to the master control circuit so that this circuit now proceeds to issue the next orders.

In accordance with our assumption the digit 0, the sign indicator in the number 053234 may now be used. After the steering circuit is again set by the orders

1-S, 1-E, POS a new order

1MV, ZRU, NCR-C (assuming by way of example that the number 053234 is in the Z register), is issued. In this case zero will be used as a multiplier and this will result in the operation of the R0 relay 806. Since any quantity multiplied by 0 is 0, means have been provided here to advance immediately without going through the motions of operating the multiplying relays and the registers.

The IS-1 relay 1303 is operated as before. The R0 relay 806 immediately grounds the lead 808 going to the RG0 relay 1106 and this extends ground over its front contact and armature 11 to conductor 1110 leading to TAX relay 1318. Thereupon ground placed on conductor 809 by the R0 relay 806 is extended by TAX relay 1318 to conductor 1319, armature 6 and front contact of IS–1 relay 1303, conductor 1316, armature 3 and front contact of 1–E relay 1001, conductor 1005 to the END relay 1104 thus ending the operation without changing the value heretofore accumulated in the C register.

Now it is to be noted that the value 8311060 which has been accumulated by the multiplication of the three portions 8765, 66666 and 53234 and the addition of the portions 9, 9 and 0 may be transferred to some other register for use later in another calculating operation. For example, suppose that it is desired to transmit the value 8311060 now registered in the C register to the Q register so that it will be available for use in another calculation. The appropriate master codes, as explained in the said Andrews-Vibbard application, are ordered and will effect the transfer with the proper shift. Because the Q register has only five orders V through Z, the last two digits 60 will be lost in the transfer and the number will be registered in the Q register in orders V through Z as 83110. When the value 83110 now registered in the Q register is used as a multiplier, the routine order will direct the operation of the SIGN relay 1102 instead of either the POS relay 1100 or the NEG relay 1111 for it is not known beforehand what the sign of the factor is going to be.

As described in detail in the said Andrews-Vibbard application, there are three sign features in the steering circuit of the calculator:

(a) POS (positive) for transferring a number summed to the D register in the adder in its true or absolute form to the B register in the adder.

(b) NEG (negative) for transferring a number summed to the D register in the adder in its inverted or complementary form to the B register in the adder.

(c) SIGN for operating the SIGN relay to set the steering circuit so that either a positive condition (as in (a) above) or a negative condition (as in (b) above) will be established under control of the sign indicator digit. If the sign indicator digit indicates a negative value a negative condition will be established and conversely a sign indicator digit indicating a positive value will establish a positive condition. Under a POS condition, the POS relay in the steering circuit operates and prepares a circuit for the operation of the N0 relay which, in turn, controls the transmission between the D and B registers and effects the transfer of a number between the two registers, D and B, without inversion. Under a NEG condition, the NEG relay in the steering circuit operates and prepares a circuit for the operation of the C0 relay which, in turn, controls the transmission between the D and B registers and effects the transfer of a number from the D register to the B register in its inverted or complementary form.

There are two sign leads 810 and 811 leading from the multiplier relays through the SIGN relay 1102 to the negative and positive relays, respectively. Hence, if the first digit 8 of this number is used to operate the multiplier relays it will operate the O5 relay 801 and the 3'Q relay (not shown) and consequently ground the positive lead 811 to cause the operation of the POS relay 1100. The POS relay in operating will establish a positive condition as explained above. An examination of the leads 810 and 811 will show that when this calculated first digit is an even number 0, 6, or 8 it will indicate the quantity to be positive and the POS relay will be operated setting the steering circuit to operate under a positive condition and when it is an odd number 7 or 9 it will indicate the quantity to be negative and the NEG relay will be operated setting the steering circuit to operate under a negative condition. From a practical standpoint arrangements have not been made to provide for true indications beyond this range for within the range for which the device was constructed it is not intended to multiply more than four factors together at any time. In such a case if all four factors were negative the sum of their indicator digits would be 36, thus producing the new indicator digit 6 which indicates a positive quantity. Thus the arrangement herein disclosed is capable of truly computing the sign of four factors all of which are involved in multiplication or division. The principle of these arrangements could be extended to a greater range if desired.

The calculator disclosed in the said Andrews-Vibbard application, in which an embodiment of the present invention has been incorporated, is arranged to multiply and/or divide a maximum of four factors together at any time. Therefore, as mentioned above, arrangements have not been provided for true sign indications beyond this range. It is to be understood, however, that the present invention is not limited to this range and can, by the application of the principles disclosed herein, be extended to give true sign indication in calculations involving an unlimited number of factors. These principles can be extended so that computed sign values which have even numbered units digits, i. e., 0, 2, 4, 6 or 8, will indicate a positive sign and computed sign values which have odd numbered units digits, i. e., 1, 3, 5, 7 or 9, will indicate a negative sign.

The manner in which a sign indicator digit causes the operation of either the POS relay 1100 or NEG relay 1111 will now be described in detail. Assume that after the calculations described hereinbefore have been completed and after the resulting value 83110, of which the digit 8 is a positive sign indicator, has been registered in the Q register, further calculations have been carried out and that another calculated value is registered in the C register. Assume further that it is desired to add the value registered in the C register with the value +3110 registered in the Q register. As mentioned above, every calculation performed by the calculator is carried out as a problem in multiplication. Therefore, to add the quantity in the Q register with that in the C register it is necessary to transfer the value registered in the Q register to the calculator. This transfer is accomplished by means of multiplication. Because, as described above, the character of the sign of the value indicated by the digit 8 is not known, therefore, this value will be used as a multiplier and a synthetic multiplicand of 1 will be supplied and the product of each digit of the value registered in the Q register times the multiplicand will be registered in the A and B registers of the calculator.

In accordance with the manner in which the calculator is operated and as explained fully in the Andrews-Vibbard application to perform the problem described above, the following master codes will be issued to the master control circuit:

S–0    E–3    SIGN
IMV    QRW    NCR–C

The master control circuit will, in response to codes S–0, E–3 and SIGN place a ground on conductor 719 leading to the S–0 relay 1006, place a ground on conductor 718 leading to the E-3 relay 1007 and place a ground on conductor 720 leading to SIGN relay 1002. The operation of S-0 relay 1006 sets the steering circuit to register the product of the multiplicand by the first digit of the multiplier on the D register in corresponding orders. The operation of E-3 relay 1007 causes the steering circuit to end the multiplication operations when the last multiplier digit has used the S-3 shift relay (not shown in the drawings). The operation of SIGN relay 1002, as explained hereinbefore, sets the steering circuit so that either the POS relay 1100 or the NEG relay 1111 will be operated under control of the sign indicator digit of the multiplier.

After the steering circuit has been set as described above, the master control tape is advanced and master orders 1MV, QRW and NCR-C are issued to the master control circuit. The master control circuit in response to codes 1MV, QRW and NCR-C will place a ground on conductor 705 leading to 1MV relay 800, place a ground on conductor 721 leading to QRW relay 716 and place a ground on lead 707 leading to NCR relay 1101. The operation of 1MV relay 800, which is a relay for providing a synthetic multiplicand, will cause the operation of the U0 multiplying relay 900, the V1 multiplying relay 901, the W0 multiplying relay 902 and the X0, Y0 and Z0 multiplying relays (not shown). This sets up the multiplying relays shown in Fig. 9 to express a multiplicand of 010000. Code QRW, which caused the operation of QRW relay 716, is a code for associating the Q register with the R multiple to permit the Q register to transmit the four digits in the W, X, Y and Z orders as multiplier digits, a digit at a time into the R multiple. The code QRW also provides for circuits whereby the digital value in the V order of the Q register is used as a sign indicator. The operation of QRW relay 716 will extend the BRG lead 722 and the RG leads into the circuits of the Q register as will be described below.

Code NCR-C sets the steering circuit to add the product of the current multiplication to a value previously calculated and now registered in the C register and, as described above, causes the operation of NCR relay 1101. The operation of NCR relay 1101 furnishes a ground which, as described below, is for initiating the calculating cycle.

SIGN relay 1102 in operating completes a circuit which may be traced from ground through front contact and armature 5 of SIGN relay 1102, back contact and armature 2 of BTA-1 relay 1112, BRG lead 722, front contact and armature 1 of QRW relay 716, front contact and armature of the operated quinary relays in the V order of the Q register. As described above, the digit 8 (sign indicator digit) is registered in the V order of the Q register. Therefore, the V-3 quinary relay 723 will be operated and the ground on the BRG lead 722 through front contact and armature 1 of QRW relay 716 will be extended through a front contact and armature of V-3 relay 723 to lead R3 of the R multiple. The ground on lead R3 of the R multiple will cause the operation of the 3'Q relay (not shown in Fig. 8) which, as described hereinbefore, will cause a ground to be applied to the plus lead 811. Ground on plus lead 811 is extended through back contact and armature of NEG relay 1111, through front contact and armature 2 of SIGN relay 1102, through the winding of POS relay 1100 to battery. Upon the operation of POS relay 1100 the steering circuit is set in the manner described hereinbefore for a positive condition and therefore the positive character of the sign indicator digit of the multiplier has caused the operation of the POS relay 1100. If the sign indicator digit of the multiplier had been a negative character, the NEG relay 1111 would have responded in a similar manner.

The operation of POS relay 1100 completes a circuit for the operation of BTA relay 1113 which may be traced from ground through front contact and armature 6 of SIGN relay 1102, through back contact and armature 6 of NEG relay 1111, front contact and armature 7 of POS relay 1100, through the winding of BTA relay 1113, auxiliary contacts and armature 1 of BTA-1 relay 1112 to battery. The operation of BTA relay 1113 completes an obvious circuit for the operation of BTA-1 relay 1112. BTA-1 relay 1112 operates and locks operated through its front contact and armature 3 to ground through front contact and armature 5 of SIGN relay 1102. BTA-1 relay 1112 in operating removes the ground from BRG lead 722 which extends through front contact and armature 1 of QRW relay 716. The removal of ground on conductor 722 will release the V-3 quinary relay 723 in the V order of the Q register which in turn removes ground from the R3 conductor of the R multiple. Removal of ground from the R3 conductor of the R multiple will release the 3'Q relay (not shown) of the multiplier relays which will clear the R multiple leads for the carrying out of the required calculations. The operation of BTA-1 relay 1112 will open the operating circuit for BTA relay 1113 which will release. The release of BTA relay 1113 completes a circuit which may be traced from ground through front contact and armature of NCR relay 1101 through back contact and armature 1 of BTA relay 1113 through front contact and armature 4 of BTA-1 relay 1112 over conductor 1103 through front contact and armature 10 of QRW relay 716 over conductor 709 through back contact and armature of END relay 1104 over conductor 1105 through the steering chain circuit indicated by the dotted line leading to the normal contacts of S1-1 relay 1300 and thence through armatures and contacts of non-operated S1 relay 1002, S0-3 relay 1301, S0-2 relay 1302, S0-1 relay 1305, through front contact and armature 13 of S-0 relay 1006, through the winding of S0-1 relay 1305 to battery. Relay 1305 operates and extends this chain start ground over its armature 1 and front contact to the AD conductor 1304 leading to AD relay 1200. The AD relay 1200 connects the sum leads from the A and B registers to the relays of the D register. The S0-1 relay 1305 now grounds the RG leads. Ground on the back contacts and armatures 11 and 12 of S1-1 relay 1300 is extended over back contacts and armatures 6 and 7 of S0-2 relay 1302, front contacts and armatures 11 and 12 of S0-1 relay 1305, back contacts and armatures 6 and 7 of 1S-3 relay 1313, back contacts and armatures 11 and 12 of 1S-1 relay 1303 to the SRG0 lead 1320 and the SRG0' lead 1321, respectively. These leads may be traced through armatures 5 and 6 and back contacts of RG0 relay 1106, armatures 6 and 7 and front contacts of E-3 relay 1007, armatures 1 and 2 and front contacts of S-0 relay 1006 to RG-1 lead 1003 and RG-1' lead 1004, respectively, thence through armatures 1 and 2 and front contacts of QRW relay 716 over the QRW0 lead and QRW00 lead to the binary and quinary relays, respectively, in the W order of the Q register. As assumed above, the digit 3 is registered in the W order of the Q register and consequently the W00 relay and W-3 relay (not shown) will be operated. Therefore, the RG grounds on leads QRW0 and QRW00 will be extended over the R00 and R-3 leads in the W order of the R multiple to operate 00 multiplier relay 807 and the 3'Q multiplier relay (not shown). The detailed description of the circuits of the calculator in performing the multiplication will not be repeated as they have been described hereinbefore and in the said Andrews-Vibbard application.

Perhaps the operation of the sign circuits can best be illustrated by giving two examples. These examples are shown in Figs. 16 and 17 with Fig. 16 placed above Fig. 17 as shown in Fig. 15. Assume that it is desired to multiply the number 8712 by the number 2903 and that both numbers were derived from previous calculations and because of this, their signs (positive or negative) will not be known when the problem is coded and entered in the calculator. It will be known, however, from the method of coding the previous calculations, that both factors are in their true or absolute form and not in their complementary form.

Example No. 1 in Figs. 16 and 17 pictures an operational chart intended to show the manner in which the number −8712 is multiplied by the number −2903 where it is assumed for purposes of illustration that the signs of the two numbers as determined by the previous calculations are both negative. Similarly, Example No. 2 in Figs. 16 and 17 pictures an operational chart intended to show the manner in which the number −8712 is multiplied by the number +2903 where it is assumed for purposes of illustration that the sign of one of the numbers, 2903, is positive and the other number, 8712, is negative as determined by the previous calculation. Examples No. 1 and No. 2 are two separate and distinct problems in multiplication which cannot be solved simultaneously by the calculator but which, for purposes of illustrating the functioning of the sign circuits of the calculator, will be discussed and described as a parallelism so that a comparison between the two examples can best be visualized. A number of registers is shown in Figs. 16 and 17 as files of long rectangles laid over two columnar arrangements each showing seven denominational orders marked at the top as U, V, W, X, Y, Z and Z!. Most of the registers are shown a number of times so that this showing is more in the nature of an operational chart than a schematic diagram.

As indicated at reference points 1611 and 1612 in Fig. 16, assume that the multiplicand 8712 is registered in the W, X, Y and Z orders of the Q register and that the sign indicator digit 9 for both examples (indicating a negative sign) is registered in the V order of the Q register. As indicated at reference points 1613 and 1614 in Fig. 16, assume that the multiplier 2903 is registered in the W, X, Y and Z orders of the Z register and that the sign indicator digits, 7 in Example No. 1 (indicating a negative sign) and 8 in Example No. 2 (indicating a positive sign) is registered in the V order of the Z register. Assume further that it is desired that the sign indicator digit of the derived product of the multiplying calculation be finally registered in the V order of the Q register and that the numerical value of the derived product (first four significant digits) be finally registered in the W, X, Y and Z orders of the Q register.

Now in accordance with the manner in which the calculator is operated and as explained fully in the Andrews-Vibbard application, the master control circuit will issue the following master codes as indicated at reference points 1615 and 1616 in Fig. 16:

S-2, E-5, SIGN
QMW, ZRW, CRZ-C

The code SIGN, above given, will direct the operation of the SIGN relay. As explained hereinbefore and in detail in the said Andrews-Vibbard application, the operation of the SIGN relay sets the steering circuit so that either the POS relay or the NEG relay will be operated under control of the sign indicator digit of the multiplier. In Example No. 1 the negative sign indicator digit 7 will cause the operation of the NEG relay which, in turn, prepares a circuit for the operation of the C0 relay. In Example No. 2 the positive sign indicator digit 8 will cause the operation of the POS relay which, in turn, prepares a circuit for the operation of the N0 relay.

As hereinbefore described and as described in detail in the said Andrews-Vibbard application, the operation of the C0 relay inverts the subtotal registered in the D register and converts it to its complement upon transfer to the B register, whereas the operation of the N0 relay transfers the subtotal registered in the D register to the B register without inversion. Therefore, in Example No. 1 the operation of the NEG and C0 relays will convert each subtotal registered in the D register to its complement when a transfer to the B register is made as shown at reference points 1617, 1618 and 1619. In Example No. 2 the operation of the POS and N0 relays will effect the transfer of each subtotal from the D register to the B register without inversion as shown at reference points 1620, 1621 and 1622.

The detailed operations of the calculator in multiplying numbers such as 8712 by 2903 are set forth in said Andrews-Vibbard application and are shown in Fig. 16 only to illustrate the operation of the sign circuits. The sum derived in the C register from this calculation is the final product and is temporarily registered in the W, X, Y and Z orders of the C register as indicated at reference points 1623 in Example No. 1 and 1624 in Example No. 2. The digits in the V order of the C register at these two reference points are the sign indicator digits indicating the sign (positive or negative) of the derived product when only the sign of the multiplier has been considered.

The derived product at reference point 1623 in Example No. 1 is 7471, while the derived product in Example No. 2 at reference point 1624 is 2529. It will be noted that the product obtained in Example No. 1 is the complement of the product obtained in Example No. 2. It will also be noted that the sign indicator digit 9 in the V order of the C register at reference point 1623 in Example No. 1 indicates that this derived product is negative and originates from a −2903 being used as a multiplier whereas the sign indicator digit 0 in the V order of the C register at reference point 1624 in Example No. 2 indicates that this derived product is positive and originates from a +2903 being used as a multiplier.

It will be observed that when a multiplying operation is performed using a negative multiplier as indicated by the sign indicator digit, as shown in Example No. 1, the derived product will be registered in its complementary form. It will also be observed that when a multiplying operation is performed using a positive multiplier as indicated by the sign indicator digit, as shown in Example No. 2, the derived product will be registered in its true or absolute form.

Now assume it is desired that the final product of the multiplication carried out in Example No. 1 and Example No. 2 be finally registered in the Q register in absolute or true form and not in complementary form. Because the signs of the two factors used in the multiplying operation in Example No. 1 and Example No. 2 were not known when the problem was coded and entered into the calculator, as assumed hereinbefore, it will not be known whether the derived product will be in absolute or complementary form. Therefore, to assure that the final derived product is in absolute form an additional operation must be performed upon it. This operation in the nature of a conversion operation will, as described hereinafter, invert any product registered in complementary form and place it in true form without affecting its sign and will have no affect upon a product registered in true form. Example No. 1 illustrates the conversion operation upon a negative derived product in complementary form to convert it to a negative product in absolute form. Example No. 2 illustrates the conversion operation upon a positive derived product in absolute form and shows that the conversion operation produces no change.

The master control circuit will issue the following master code as indicated at reference point 1625 in Fig. 16:

CZA,    CZB

This code as fully explained in said Andrews-Vibbard application, directs the release of the Z register to wipe out any values registered therein and connects it to the C multiple to be reset in accordance with the values registered in the V, W, X, Y and Z orders of the C register. This transfer is required to permit the storing of a derived product so that the C register may be cleared and used in further calculations. The derived product after being transferred appears in the Z register as shown in Fig. 16 at reference point 1626 in Example No. 1 and at reference point 1627 in Example No. 2.

The master control circuit will now issue the following master codes as indicated at reference points 1711 and 1712 of Fig. 17 to initiate the conversion operation hereinbefore discussed:

S–1,    E–4,    SIGN
IMV,    ZRW,    CRZ–C

These codes direct the carrying out of a multiplication problem similar to that described hereinbefore except that a synthetic multiplicand 010000 in orders U, V, W, X, Y and Z is used and the digits in the W, X, Y and Z orders of the Q register at reference points 1626 and 1627, for example, No. 1 and No. 2, respectively, are used as multipliers. Assume that it is desired that the derived product of this multiplying operation be registered in the W, X, Y and Z orders of the C register and that the sign indicator digit of the derived product be registered in the V order of the C register. The operation of the SIGN relay and the POS, N0 or NEG, C0 relays follows a similar pattern as described hereinbefore. The negative sign indicator digit 9 in the V order of the Z register at reference point 1626 in Example No. 1 will control the operation of the NEG and C0 relays and cause the subtotals registered in the D register to be inverted when a transfer to the B register is made as shown at reference points 1713, 1714, 1715 and 1716 in Fig. 17. The positive sign indicator digit 0 in the V order of the Z register at reference point 1627 in Example No. 2 will control the operation of the POS and N0 relays and cause the subtotals in the D register to be transferred to the B register without inversion as shown at reference points 1717, 1718, 1719 and 1720 in Fig. 17.

The derived product from this multiplication operation is shown at reference point 1721 in Example No. 1 and at reference point 1722 in Example No. 2. As assumed hereinbefore, the numerical value of the product for both examples was to be registered in the W, X, Y and Z orders of the C register. It will be noted that the derived product in both Examples No. 1 and No. 2 is 2529. It will also be noted that the sign indicator digit in the V order of the C register at reference point 1721 in Example No. 1 is 9 indicating a negative derived product and that the sign indicator digit in the V order of the C register at reference point 1722 in Example No. 2 remains 0 indicating a positive derived product.

It will be observed that the affect of this latter multiplying operation in Example No. 1 was to convert the derived product registered in its complementary form in the W, X, Y and Z orders of the C register at reference point 1623 to its true or absolute form as shown in the W, X, Y and Z orders of the C register at reference point 1721 and that the negative sign indicator digit in the V order of the C register at both reference points 1623 and 1721 remained unchanged. It will also be observed that this latter multiplying operation had no affect upon the derived product in Example No. 2 or upon its sign indicator digit as both remained unchanged as indicated at reference points 1624 and 1722.

Thus far no consideration has been given to the sign of the multiplicand which in both Examples No. 1 and No. 2 is negative as indicated at reference points 1611 and 1612 by the digit 9 in the V order of the Q register. The calculator will now proceed to add the sign indicator digit 9 in the V order of the Q register at reference points 1611 and 1612 in Examples No. 1 and No. 2 to the sign indicator digit in the V order of the C register containing the final derived product which in Example No. 1 is 9 as indicated at reference point 1721 and in Example No. 2 is 0 as indicated at reference point 1722. The manner in which this operation is carried out is similar to that hereinbefore described and differs only in that the sign indicator digits are to be summed in the V order of the C register instead of the U order of the C register as was the case in the previous example. This difference accounts for the difference in the master codes set up hereinafter.

The master control circuit will issue the following master codes as indicated at reference points 1723 and 1724 of Fig. 17:

S–0,    E–0,    POS
IMV,    QRV,    NCR–C

In a manner similar to that hereinbefore described the sign indicator digit 9 in the V order of the Q register in both Examples No. 1 and No. 2 at reference points 1611 and 1612 will be entered in the calculator as shown at reference points 1725 and 1726 for Example No. 1 and 1727 and 1728 for Example No. 2 and will be added to the sign indicator digit of the derived product in the V order of the C register at reference point 1721 in Example No. 1 and at reference point 1722 in Example No. 2. In a manner similar to that hereinbefore described, the units value of the derived sum will be entered in the V order of the C register and will be the sign indicator digit of the final derived product. In Example No. 1 the digit 8 in the V order of the C register at reference point 1729 indicates a positive sign. In Example No. 2 the digit 9 in the V order of the C register at reference point 1730 indicates a negative sign.

The master control circuit will now issue the following master code as indicated at reference point 1731 of Fig. 17:

CQA, CQB

This code, as fully explained in the said Andrews-Vibbard application, directs the release of the Q register to wipe out any value registered therein and connects it to the C multiple to be reset in accordance with the values registered in the V, W, X, Y and Z orders of the C register. This transfer permits the C register to be cleared and used for subsequent calculations. The final product and its associated sign indicator digit are now registered in the Q register as shown at reference point 1732 in Example No. 1 and at reference point 1733 in Example No. 2.

It will be observed that the numerical value of the derived product (first four significant digits) obtained by multiplying 8712 by 2903 is 2529 in both examples. It will also be observed in Example No. 1 where it was assumed that both the multiplicand and the multiplier were negative that the sign indicator digit finally obtained was positive as indicated by the digit 8 in the V order of the Q register at reference point 1732. Likewise it will be observed in Example No. 2 where it was assumed that the multiplicand was negative and the multiplier was positive that the sign indicator digit finally obtained was negative as indicated by the digit 9 in the V order of the Q register at reference point 1733.

What is claimed is:

1. In a calculating device, a plurality of three or more multidigit registers for storing numbers, a multidigit calculator comprising an augend register, an addend register, an accumulator and a temporary storage register, said accumulator and said temporary storage register being used alternatively as sum registers, master control means for controlling the transfer of numbers between said multidigit registers and said calculator, means under control of said master control means for operating said calculator to accumulate in said accumulator a value derived from the multiplication of a given number of digits less than the total thereof from each of said multidigit registers and the addition of the remaining digits from the same said multidigit registers.

2. In a calculating device, storage registers each having a plurality of denominational orders for storing a sign indicator digit and a multidigit number, a multidigit calculator having augend, addend and sum registers, master control means for said calculating device including means for transferring a plurality of three or more of said multidigit numbers from said storage registers to said calculator registers and for controlling said calculator to multiply and/or divide the transferred multidigit numbers, said master control means also including means for transferring the sign indicator digits of said transferred multidigit numbers from said storage registers to said calculator and for summing the three or more transferred sign indicator digits and means for associating the units digit of the sum of said three or more transferred sign indicator digits as a sign indicator with the derived result of said multiplying and/or dividing operation.

3. In a calculating device, storage registers each having a plurality of denominational orders for storing a multidigit factor and a digit indicating the sign of said factor by its value, the values 0, 2, 4, 6 or 8 of the sign indicator digit indicating a plus sign and the values 1, 3, 5, 7 or 9 of the sign indicator digit indicating a minus sign, said sign indicator digit and said multidigit factor being combined into the form of a multidigit number with the sign indicator digit in the first or extreme left-hand denominational order, a multidigit calculator having augend, addend and sum registers, master control means for said calculating device including means for transferring three or more of the multidigit factors from said storage registers to said calculator registers and for controlling said calculator to multiply and/or divide the transferred multidigit factors, said master control means also including means for transferring the sign indicator digits of said transferred multidigit factors from said storage registers to said calculator and for summing the three or more transferred sign indicator digits with the result of said previous multiplying and/or dividing operation whereby the units digit of the sum of said three or more transferred sign indicator digits will become a new sign indicator in a denominational order one place to the left of the calculated result, the calculated sign indicator digit indicating signs by character, even for plus and odd for minus.

4. In a calculating device in which multidigit numbers are entered as factors each preceded by a 0, 2, 4, 6 or 8 for a plus sign indicating digit or a 1, 3, 5, 7 or 9 for a minus sign indicating digit, a multidigit calculator, master control means for controlling the operation of said calculating device including said calculator in accordance with a variety of prearranged patterns, means responsive to said master control means when it orders a calculation with a plurality of three or more of said factors in accordance with a formula involving multiplication and/or division for extracting the said sign indicating digits of said three or more factors, summing the extracted digits and issuing the units digit of the sum of the said extracted digits as a sign indicator for the result of said ordered calculation.

5. In a calculating device in which multidigit numbers are entered as factors each preceded by a 0, 2, 4, 6 or 8 for a plus sign indicating digit or a 1, 3, 5, 7 or 9 for a minus sign indicating digit, a multidigit calculator, master control means for controlling the operation of said calculating device including said calculator in accordance with a variety of prearranged patterns, means responsive to said master control means when it orders a calculation with said factors in accordance with a formula involving addition for extracting the said sign indicating digits of said factors, positive and negative sign control means responsive to the even or odd character of the extracted sign indicating digits for controlling said calculator to calculate a sign indicator digit indicating the sign of the result of the ordered calculation and means for issuing the calculated sign indicator digit as a sign indicator for the result of said ordered calculation.

6. In a calculator, storage registers each having a plurality of denominational orders for storing a number and an associated sign indicator digit, summing means comprising augend, addend and sum registers each having a plurality of denominational orders, means for transferring the numbers stored in said storage registers to said summing means, means for controlling said summing means to sum said numbers, positive and negative sign control means, means controlled by the odd or even character of the value of any of the sign indicator digits 0 through 9 inclusive of each said number for selectively operating said sign control means and further means including said summing means controlled by said sign control means for determining the sign of the sum of said numbers.

7. In a calculator, storage register each having a plurality of denominational orders for storing a sign indicator digit and an associated multidigit number, the extreme left-hand denominational order of each one of said storage registers being used to store said sign indicator digit to indicate the sign, plus or minus, of the associated multidigit number stored in the remaining denominational orders of the same said one of said registers, summing means comprising augend, addend and sum registers each having a plurality of denominational orders, means for transferring the multidigit numbers stored in said storage registers to said summing means, means for controlling said summing means to sum said multidigit numbers, positive and negative sign control means, means controlled by the odd or even character of the sign indicator digit in the extreme left-hand denominational order of each of said storage registers for selectively controlling said sign control means whereby said positive sign control means will be operated in response to any one of a plurality of even numbered sign indicator digits and said negative sign control means will be operated in response to any one of a plurality of odd numbered sign indicator digits and means including said summing means controlled by said sign control means for determining the sign of the sum of said multidigit number.

8. In a calculator, storage registers each having a plurality of denominational orders for storing multidigit factors and associated sign indicator digits, a plurality of three or more of said factors being used to calculate the value of a product or a quotient, each of said sign indicator digits expressing the sign, plus or minus, of its associated factor by its character, odd numbered sign indicator digits expressing a minus sign and even numbered sign indicator digits expressing a plus sign, summing means comprising augend, addend and sum registers each having a plurality of denominational orders for deriving a sign indicator digit for said product or said quotient of said three or more of said factors, each of a plurality of derived odd sign indicator digits representing minus values and each of a plurality of derived even sign indicator digits representing plus values, means for transferring the sign indicator digits of said three or more of said factors from said storage registers to said summing means whereby the sign indicator digit representing the sign of said product or the sign indicator digit representing the sign of said quotient may be determined by adding together the sign indicator digits of said three or more of said factors to be used for determining the value of said product or said quotient.

9. In a calculator, means for calculating the sign of a function derived from the multiplication, division or multiplication and division of a plurality of three or more factors each factor of which is expressed by a multidigit number whose sign is expressed by any one of a plurality of even numbered digits for plus or any one of a plurality of odd numbered digits for minus, comprising a plurality of storage registers each being arranged to store one of said factors, summing means for summing the sign expressing digits of said factors to calculate a sign expressing digit for said function, means for transferring the sign expressing digits of said factors from said registers to said summing means and means for associating the calculated sign expressing digit of said function with said function.

10. In a calculator, means for calculating the sign of a function derived from a plurality of three or more factors to be multiplied or divided into one another, each of said factors having a sign expressed by any one of the digits 0, 2, 4, 6 or 8 for plus or 1, 3, 5, 7 or 9 for minus, comprising a plurality of storage registers each being arranged to store one of said factors, a summing means, means for transferring the sign expressing digits of said factors from said registers to said summing means, means for controlling said summing means to sum said sign expressing digits to calculate a sign expressing digit for said function and means for associating the calculated sign expressing digit of said function with said function.

11. In a calculating device, storage registers each having a plurality of denominational orders for storing a multidigit factor and a digit indicating the sign of said factor, the sign indicator digit being any one of a plurality of odd digits indicating a minus sign or any one of a plurality of even digits indicating a plus sign, said sign indicator digit and said multidigit factor being combined into the form of a multidigit number with said sign indicator digit in the first or extreme left-hand denominational order, a multidigit calculator having augend, addend and sum registers, master control means for said calculating device including means for transferring a plurality of three or more of the multidigit factors from said storage registers to said calculator registers and for controlling said calculator to sum the transferred multidigit factors, said master control means also including means for transferring the sign indicator digits of said transferred multidigit factors from said storage registers to said calculator, positive and negative sign control means responsive to the character, odd or even, or each transferred sign indicator digit for controlling said calculator whereby said calculator will calculate a sign indicator digit for the sum of said multidigit factors and means for placing the calculated sign indicator digit with the result of the sum of said transferred multidigit factors whereby the calculated sign indicator digit will become a new sign indicator for the resulting sum of said transferred multidigit factors in a denominational order one place to the left of the calculated resulting sum.

12. In a calculating device, storage registers each having a plurality of denominational orders for storing a multidigit factor and a digit indicating the sign of said factor by its value, the values 0, 2, 4, 6 or 8 of the sign indicator digit indicating a plus sign and the values 1, 3, 5, 7 or 9 of the sign indicator digit indicating a minus sign, said sign indicator digit and said multidigit factor being combined into the form of a multidigit number with the sign indicator digit in the first or extreme left-hand denominational order, a multidigit calculator having augend, addend and sum registers, master control means for said calculating device including means for transferring three or more of the multidigit factors from said storage registers to said calculator registers and for controlling said calculator to sum the transferred multidigit factors, said master control means also including means for transferring the sign indicator digits of said transferred multidigit factors from said registers to said calculator, positive and negative sign control means responsive to the character, odd or even, of each transferred sign indicator digit for controlling said calculator to calculate a sign indicator digit for the sum of said transferred multidigit factors and means for placing the calculated sign indicator digit with the result of the sum of said transferred multidigit factors whereby the calculated sign indicator digit will become a new sign indicator for the resulting sum of said transferred multidigit factors in a denominational order one place to the left of the calculated resulting sum.

References Cited in the file of this patent
UNITED STATES PATENTS

| Number | Name | Date |
|---|---|---|
| 2,174,683 | Bryce | Oct. 3, 1939 |
| 2,185,697 | Wood | Jan. 2, 1940 |
| 2,344,885 | Kozma | Mar. 21, 1944 |
| 2,616,624 | Lake et al. | Nov. 4, 1952 |